United States Patent
Marsh et al.

(10) Patent No.: US 8,519,055 B2
(45) Date of Patent: *Aug. 27, 2013

(54) THERMOSETTING POLYESTER COATING COMPOSITIONS CONTAINING TETRAMETHYL CYCLOBUTANEDIOL

(75) Inventors: Stacey James Marsh, Church Hill, TN (US); Angela Hartley Honeycutt, Johnson City, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/418,584

(22) Filed: Mar. 13, 2012

(65) Prior Publication Data

US 2012/0172520 A1 Jul. 5, 2012

Related U.S. Application Data

(63) Continuation of application No. 12/367,202, filed on Feb. 6, 2009, now Pat. No. 8,163,850.

(51) Int. Cl.
  C08L 67/02 (2006.01)
  C08G 63/199 (2006.01)
  C08G 63/127 (2006.01)
  C08G 63/181 (2006.01)

(52) U.S. Cl.
  USPC .......... 525/173; 525/174; 525/176; 525/445; 525/448; 528/302

(58) Field of Classification Search
  USPC .......... 525/173, 174, 176, 445, 448; 528/302
  See application file for complete search history.

(56) References Cited

U.S. PATENT DOCUMENTS

| | | |
|---|---|---|
| 2,891,930 A | 6/1959 | Caldwell et al. |
| 3,227,764 A | 1/1966 | Martin et al. |
| 3,313,777 A | 4/1967 | Elam et al. |
| 3,345,313 A | 10/1967 | Ruhf et al. |
| 3,484,339 A | 12/1969 | Caldwell |
| 3,502,620 A | 3/1970 | Caldwell |
| 3,538,187 A | 11/1970 | Feltzen |
| 3,789,044 A | 1/1974 | Taft et al. |
| 3,856,830 A | 12/1974 | Kuehn |
| 4,074,061 A | 2/1978 | Musser |
| 4,076,766 A | 2/1978 | Simms |
| 4,267,279 A | 5/1981 | Howell |
| 4,299,933 A | 11/1981 | McConnell et al. |
| 4,322,508 A | 3/1982 | Peng et al. |
| 4,338,379 A | 7/1982 | Strolle et al. |
| 4,350,807 A | 9/1982 | McConnell et al. |
| 4,363,908 A | 12/1982 | Joyner et al. |
| 4,397,989 A | 8/1983 | Adesko |
| 4,480,077 A | 10/1984 | Hefner, Jr. |
| 4,525,504 A | 6/1985 | Morris et al. |
| 4,525,544 A | 6/1985 | Nelson et al. |
| 4,581,093 A | 4/1986 | Noyes et al. |
| 4,585,854 A | 4/1986 | Tung et al. |
| 4,698,391 A | 10/1987 | Yacobucci et al. |
| 4,716,200 A | 12/1987 | Berghoff |
| 4,724,173 A | 2/1988 | Rockett et al. |
| 4,737,551 A | 4/1988 | Dervan et al. |
| 4,751,267 A | 6/1988 | Berghoff |
| 4,859,760 A | 8/1989 | Light, Jr. et al. |
| 4,910,292 A | 3/1990 | Blount |
| 4,939,233 A | 7/1990 | Jenkins et al. |
| 4,959,259 A | 9/1990 | Guilbaud |
| 5,017,679 A | 5/1991 | Chang et al. |
| 5,023,367 A | 6/1991 | Calbo, Jr. et al. |
| 5,025,086 A | 6/1991 | Blount, Jr. et al. |
| 5,097,006 A | 3/1992 | Kapilow et al. |
| 5,124,388 A | 6/1992 | Pruett et al. |
| 5,160,792 A | 11/1992 | Barbee et al. |
| 5,245,002 A | 9/1993 | Kuo |
| 5,254,637 A | 10/1993 | Witzeman et al. |
| 5,256,759 A | 10/1993 | Kuo |
| 5,256,761 A | 10/1993 | Blount, Jr. |
| 5,306,567 A | 4/1994 | Kuo et al. |
| 5,344,872 A | 9/1994 | Debord et al. |
| 5,349,026 A | 9/1994 | Emmons et al. |
| 5,371,148 A | 12/1994 | Taylor et al. |
| 5,393,609 A | 2/1995 | Chang et al. |
| 5,393,840 A | 2/1995 | Kuo |
| 5,397,641 A | 3/1995 | Moens et al. |
| 5,416,187 A | 5/1995 | Kuo et al. |
| 5,439,988 A | 8/1995 | Moens et al. |

(Continued)

FOREIGN PATENT DOCUMENTS

| | | |
|---|---|---|
| BE | 615850 | 7/1962 |
| EP | 1647564 | 4/2006 |

(Continued)

OTHER PUBLICATIONS

International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.
USPTO Office Action dated Nov. 30, 2010 for U.S. Appl. No. 12/367,190.

(Continued)

*Primary Examiner* — Mike M Dollinger
(74) *Attorney, Agent, or Firm* — Jennifer R. Knight; Eric Middlemas

(57) ABSTRACT

Disclosed are polyester resins and solvent borne thermosetting coating compositions that include these resins in combination with at least one crosslinker. The polyester resins contain 2,2,4,4-tetramethyl-1,3-cyclobutanediol and exhibit a combination of good solubility in organic solvents and high hardness with good flexibility in a coating composition.

20 Claims, No Drawings

(56) References Cited

U.S. PATENT DOCUMENTS

| | | | |
|---|---|---|---|
| 5,464,909 | A | 11/1995 | Chang et al. |
| 5,498,668 | A | 3/1996 | Scott |
| 5,554,701 | A | 9/1996 | Chang et al. |
| 5,596,037 | A | 1/1997 | Moens et al. |
| 5,646,237 | A | 7/1997 | George et al. |
| 5,852,120 | A | 12/1998 | Bederke |
| 5,955,565 | A | 9/1999 | Morris et al. |
| 6,087,464 | A | 7/2000 | Swarup et al. |
| 6,120,851 | A | 9/2000 | Borgholte et al. |
| 6,248,843 | B1 | 6/2001 | Panandiker et al. |
| 6,265,072 | B1 | 7/2001 | Fagerburg |
| 6,423,816 | B1 | 7/2002 | Wamprecht et al. |
| 6,887,937 | B1 | 5/2005 | Vandevoorde et al. |
| 6,992,133 | B2 | 1/2006 | Yokoyama et al. |
| 6,995,194 | B2 | 2/2006 | Moens et al. |
| 7,087,672 | B2 | 8/2006 | Yuan et al. |
| 7,141,625 | B2 | 11/2006 | Komazaki et al. |
| 8,163,850 | B2 * | 4/2012 | Marsh et al. ............ 525/445 |
| 8,168,721 | B2 * | 5/2012 | Marsh et al. ............ 525/173 |
| 2001/0051706 | A1 | 12/2001 | George et al. |
| 2002/0103329 | A1 | 8/2002 | Koldijk et al. |
| 2004/0024140 | A1 | 2/2004 | Fujita et al. |
| 2006/0079650 | A1 | 4/2006 | Stevenson et al. |
| 2006/0286383 | A1 | 12/2006 | Gilmer |
| 2007/0020557 | A1 | 1/2007 | Yao et al. |
| 2007/0092746 | A1 | 4/2007 | Wayton et al. |
| 2007/0232778 | A1 | 10/2007 | Moody et al. |
| 2008/0139687 | A1 | 6/2008 | Woods et al. |
| 2010/0204388 | A1 | 8/2010 | Marsh et al. |
| 2010/0204401 | A1 | 8/2010 | Marsh et al. |
| 2010/0204413 | A1 | 8/2010 | Powell et al. |
| 2012/0202920 | A1 | 8/2012 | Marsh et al. |

FOREIGN PATENT DOCUMENTS

| | | |
|---|---|---|
| GB | 1044015 | 9/1966 |
| GB | 1130558 | 10/1968 |
| WO | WO 9412557 | 6/1994 |
| WO | WO 9501407 | 1/1995 |
| WO | WO 9633229 | 10/1996 |
| WO | WO 2006083343 | 8/2006 |
| WO | WO 2006138198 | 12/2006 |
| WO | WO 2007078851 | 7/2007 |

OTHER PUBLICATIONS

USPTO Office Action dated Nov. 30, 2010 for U.S. Appl. No. 12/367,151.
USPTO Office Action dated Mar. 18, 2011 for U.S. Appl. No. 12/367,151.
USPTO Office Action dated Mar. 21, 2011 for U.S. Appl. No. 12/367,190.
USPTO Office Action dated Mar. 15, 2012 for U.S. Appl. No. 12/367,133.
USPTO Office Action dated Jun. 27, 2012 for U.S. Appl. No. 13/435,347.
Heidt, et al., "Florida weathering of Isophthalic Acid-Based, Melamine-Crosslinked Polyester Coatings", Proceedings of the Twenty-Seventh International Waterborne, High-Solids and Powder Coatings Symposium, (2000), pp. 295-307.
Anonymous, "The Use of Cycloaliphatic Diacids and Anhydrides as Monomers for Polyester Polymers to Improve their Compatibility with Acrylic Polymners", Research Disclosure, 360, (1994), pp. 229-230.
Husbands, M.J., et al. "Polyester Resins", A Manual of Resins for Surface Coatings, vol. III, pp. 63-167.
Wicks, Zeno Jr., et al., "Polyester Resins", Organic Coatings Science and Technology, $2^{nd}$ ed.,13, (1999), pp. 246-257.
Oldring, P.K.T., et al., "Vinyl and Acrylic Monomners", A Manual of Resins for Surface Coatings, vol. II, pp. 121-210.
Seo, Kab S., et al., "Drying Characteristics and Rheology of Carboxymethylcellulose Acetate Butyrate in Waterborne Coatings", Proceedings of the Thirty First International Waterborne, High-Solids, and Powder Coatings Symposium (2004), pp. 221-236.
Jorissen, D.A., et al., "Higher Solids Polyurethane Coatings", Proceedings of the International Waterborne, High-Solids and Powder Coatings Symposium (1992), $19^{th}$ ed. pp. 182-195.
Ni, Hai, et al.; "Cycloaliphatic Polyester Based High Solids Polyurethane Coatings: I. The Effect of Difunctional Alcohols"; Journal of Coatings Technology, vol. 74, No. 928, (2002), pp. 49-56.
Vandevoorde, P., et al. Making solid gains Novel acrylic and polyester polyols reduce VOCs in solventborne urethanes , European Coatings Journal (2005) (9) pp. 22-24, 26-29.

* cited by examiner

THERMOSETTING POLYESTER COATING COMPOSITIONS CONTAINING TETRAMETHYL CYCLOBUTANEDIOL

CROSS REFERENCES TO RELATED APPLICATIONS

This application is a Continuation application of U.S. Non-Provisional application Ser. No. 12/367,202, filed Feb. 6, 2009, (now U.S. Pat. No. 8,163,850) which is incorporated herein by reference in its entirety.

FIELD OF THE INVENTION

This invention pertains to curable polyesters for solvent borne, thermosetting coating compositions. More specifically, this invention pertains to curable polyesters containing 2,2,4,4-tetramethyl-1,3-cyclobutanediol and thermosetting coating compositions prepared from these polyesters.

DETAILED DESCRIPTION

Solvent-borne thermosetting coatings that exhibit high hardness are desirable. Coatings with high hardness typically exhibit high gloss, good distinctness of image (DOI), fast dry-times, scratch, stain, chemical, and humidity resistance, and outdoor durability. Polyester resins containing a high amount of 2,2-dimethyl-1,3-propanediol (abbreviated herein as "NPG") and isophthalic acid (abbreviated herein as "IPA") exhibit a particularly good combination of these coating properties related to hardness. These polyester resins, however, often exhibit poor solubility in organic solvents and tend to give coatings with poor flexibility.

Poor resin solubility often manifests itself over time by phase separation, precipitation of the resin from solution, and the development of hazy to opaque resin solutions. These characteristics are undesirable and limit the storage stability of the resin solution and the coatings formulated from these solutions. Such coatings, for example, may experience a viscosity increase, phase separation, agglomeration of ingredients, etc., that result in an undesirable higher application viscosity, poor appearance and poor mechanical properties of the cured film.

Solubility sometimes can be improved by incorporating various diols and dicarboxylic acids and anhydrides into the resin formulation. Examples of diols that can improve solubility include 1,6-hexanediol (abbreviated herein as "HD"), 2,2,4-trimethyl-1,3-pentanediol (abbreviated herein as "TMPD") and 2-butyl-2-ethyl-1,3-propanediol (abbreviated herein as "BEPD"). Similarly, examples of dicarboxylic acids and anhydrides that can improve solubility include adipic acid (abbreviated herein as "AD"), 1,4-cyclohexanedicarboxylic acid (abbreviated herein as "CHDA") and hexahydrophthalic anhydride (abbreviated herein as "HHPA"). Although these monomers can improve solubility, they also can reduce coating hardness and adversely affect the desirable properties associated with improved hardness.

It is known that coatings formulated with polyester resins generally have hardness inferior to acrylic coatings. Moreover, it is known that polyesters with high hardness tend to exhibit poor solubility in organic solvents that limits useful shelf life and the ability to formulate solvent borne thermosetting coatings. It would be desirable, therefore, to improve polyester resin solubility while maintaining coating hardness and the properties associated with higher hardness. We have found that this can be achieved by incorporating 2,2,4,4-tetramethyl-1,3-cyclobutanediol (abbreviated herein as "TMCD") into the polyester resin composition.

The present invention provides a curable polyester prepared from 2,2,4,4-tetramethyl-1,3-cyclobutanediol. Thus, one embodiment of our invention is a curable polyester, comprising:

i. diacid residues, comprising about 20 to 100 mole percent, based on the total moles of diacid residues, of the residues of isophthalic acid;
ii. diol residues, comprising about 10 to 100 mole percent, based on the total moles of diol residues, of the residues of 2,2,4,4-tetramethyl-1,3-cyclobutanediol; and
iii. about 2 to about 40 mole percent of the residues of a polyol, based on the total moles of diol and polyol residues;
wherein the curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester.

The polyester resins of the invention exhibit good solubility in organic solvents even with high amounts of aromatic dicarboxylic acid content. Coatings formulated from these polyester resins exhibit good hardness, stain resistance, chemical resistance, humidity resistance and outdoor durability. Relative to the gain in hardness, these coatings exhibit good flexibility. Therefore, another embodiment of the present invention is a thermosetting coating composition, comprising:

(A). about 50 to about 90 weight percent, based on the total weight of (A) and
(B) of a curable polyester, comprising
  i. diacid residues, comprising about 20 to 100 mole percent, based on the total moles of diacid residues, of the residues of isophthalic acid;
  ii. diol residues, comprising about 10 to 100 mole percent, based on the total moles of diol residues, of the residues of 2,2,4,4-tetramethyl-1,3-cyclobutanediol; and
  iii. about 2 to about 40 mole percent of the residues of at least one polyol, based on the total moles of diol and polyol residues;
  wherein the curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester;
(B). about 10 to about 50 weight percent, based on the total weight of (A) and (B) of at least one crosslinker comprising at least one compound reactive with a carboxylic acid or a hydroxyl group;
(C). about 10 to about 60 weight percent, based on the total weight of (A), (B), and (C) of at least one solvent.

The polyester resins may be used to formulate factory and field-applied coatings used in auto OEM, auto refinish, transportation, aerospace, maintenance, marine, machinery and equipment, general metal, appliance, metal furniture, plastic and building/construction coating applications.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable polyester", as used herein, is synonymous with the term "resin" and is intended to mean a thermosetting surface coating polymer prepared by the polycondensation of one or more acid components, diol components, and polyol components. The curable polyester of the present invention is a thermoset polymer and is particularly suitable as a resin for solvent-based coatings. This polyester has a low molecular weight, typically about 500 to about 10,000 daltons, and would not be suitable for the fabrication of films, sheets, and other shaped objects by extrusion, casting, blow molding, and other thermoforming processes commonly used for high molecular weight thermoplastic polymers. The polyester has reactive functional groups, typically hydroxyl groups or carboxyl groups for the purpose of later reacting with crosslinkers in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. The concept is known to those skilled in the art and described, for example, in *Organic Coatings Science and Technology*, 2nd ed., p. 246-257, by Z. Wicks, F. Jones, and S. Pappas, Wiley, New York, 1999.

Typically, the acid component comprises at least one dicarboxylic acid and may, optionally, include mono- and polybasic carboxylic acids. For example, the curable polyester may be prepared from an acid component comprising an aromatic dicarboxylic acid such as, for example, isophthalic acid, an acyclic aliphatic, or cycloaliphatic dicarboxylic acid such as, for example, adipic acid or 1,3-cyclohexanedicarboxylic acid, or a mixture of one or more aromatic, aliphatic, and cycloaliphatic acids. The diol component may comprise one or more aliphatic cycloaliphatic diols such as, for example, 2,2,4,4-tetramethyl-1,3-cyclobutanediol, linear or branched aliphatic diols such as, for example, neopentyl glycol, or aromatic diols such as, for example, p-xylenediol. Catalysts may be used to accelerate the rate of the polycondensation reaction. Additional examples of each of the components of the curable polyester include those known in the art including those discussed below, and in various documents known in the art such as, for example, in *Resins for Surface Coatings*, Vol. III, p. 63-167, ed. by P. K. T. Oldring and G. Hayward, SITA Technology, London, UK, 1987.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a curable polyester.

The curable polyester of the present invention comprises an acid component, a diol component, and a polyol component. The acid component comprises the residues of an aromatic dicarboxylic acid, an acylic, aliphatic dicarboxylic acid, an alicyclic dicarboxylic acid, or a combination thereof; the diol component comprises the residues of 2,2,4,4-tetramethyl-1,3-cyclobutanediol. Therefore, in a general embodiment, our invention provides a curable polyester, comprising:

i. diacid residues, comprising about 20 to 100 mole percent, based on the total moles of diacid residues, of the residues of at least one aromatic diacid and about 80 to 0 mole percent of the residues of at least one acyclic aliphatic diacid, alicyclic diacid, or a combination thereof;

ii. diol residues, comprising about 10 to 100 mole percent, based on the total moles of diol residues, of the residues of 2,2,4,4-tetramethyl-1,3-cyclobutanediol; and iii. about 2 to about 40 mole percent of the residues of at least one polyol, based on the total moles of diol and polyol residues;

wherein the curable polyester has a number average molecular weight of about 500 to about 10,000 daltons, a glass transition temperature of about −35° C. to about 100° C., a hydroxyl number of about 20 to about 300 mg KOH/g of polyester, and acid number of 0 to about 80 mg potassium hydroxide KOH/g of polyester.

The curable polyester can comprise about 20 to 100 percent, based on the total moles of diacid residues, of the residues of one or more aromatic diacids. Examples of aromatic diacids include, but are not limited to, phthalic acid, terephthalic acid, isophthalic acid, 2,6-naphthalenedicarboxylic acid, or combinations thereof. The 1,4-, 1,5-, and 2,7-isomers of naphthalenedicarboxylic acid or mixtures thereof may be used in addition to the 2,6-isomer. In addition to the aromatic diacid residues, the curable polyester can comprise about 80 to 0 mole percent of the residues of an acyclic aliphatic or alicyclic diacid such as, for example, adipic acid, dodecanedioic acid, sebacic acid, azelaic acid, glutaric acid, maleic acid, fumaric acid, succinic acid, 1,4-cyclohexanedicarboxylic acid, 1,3-cyclohexanedicarboxylic acid, hexahydrophthalic acid, tetrahydrophthalic acid, or combinations thereof. If cis and trans isomers are possible, the alicyclic diacid may be used as the pure cis, trans isomer or mixtures of cis/trans isomers.

We have found that when the curable polyester comprises isophthalic acid as all or a portion of the diacid component, coating compositions formulated from these polyesters exhibit good hardness, stain resistance, chemical resistance, humidity resistance, and outdoor durability. Thus, another embodiment of the invention is a curable polyester, comprising:
i. diacid residues, comprising about 20 to 100 mole percent, based on the total moles of diacid residues, of the residues of isophthalic acid;
ii. diol residues, comprising about 10 to 100 mole percent, based on the total moles of diol residues, of the residues of 2,2,4,4-tetramethyl-1,3-cyclobutanediol; and
iii. about 2 to about 40 mole percent of the residues of at least one polyol, based on the total moles of diol and polyol residues;

wherein the curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester. Some additional, non-limiting examples of the diacid component that the curable polyester can comprise are as follows: (a) about 30 to 100 mole percent of the residues of isophthalic acid; (b) about 30 to 100 mole percent of the residues of isophthalic acid and about 70 to 0 mole percent of the residues of an aliphatic diacid; (c) about 30 to 100 mole percent of the residues of isophthalic acid and about 70 to 0 mole percent of the residues of an aliphatic diacid having 8 carbons or less; (d) about 20 to about 80 mole percent of the residues of isophthalic acid and about 80 to about 20 mole percent of the residues of adipic acid; (e) about 30 to about 70 mole percent of the residues of isophthalic acid and about 70 to about 30 mole percent adipic acid; (f) about 40 to about 60 mole percent of the residues of isophthalic acid and about 60 to about 40 mole percent of the residues of adipic acid. In addition to the residues of isophthalic and aliphatic acids described above, the diacid residues may further comprise up to 30 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid. In another example, the curable polyester may comprise diacid residues comprising about 20 to 80 mole percent isophthalic acid, about 80 to about 20 mole percent adipic acid, and 0 to about 30 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid; and diol residues comprising about 20 to 100 mole percent of the residues of 2,2,4,4-tetramethyl-1,3-cyclobutanediol.

In addition to the diacid residues described above, the acid component of our inventive, curable polyester composition may further comprise the residues of a monocarboxylic acid or polybasic acid containing more than 2 carboxylic acid groups. For example, the curable polyester may comprise residues chosen from benzoic acid, acetic acid, propionic acid, tert-butyl benzoic acid, and butanoic acid; trimellitic anhydride; or a mixture thereof.

The curable polyester also comprises about 10 to 100 mole percent, based on the total moles of diol residues, of the residues of 2,2,4,4-tetramethyl-1,3-cyclobutanediol (abbreviated herein as "TMCD"). The TMCD may be used as the pure cis and trans isomer or as a mixture of cis-trans isomers. Other examples of TMCD residue content are about 20 to 100 mole percent, about 30 to about 70 mole percent, about 40 to about 60 mole percent, and about 50 mole percent. The curable polyester, optionally, may comprise up to 90 mole percent of the residues of other diols in combination with TMCD such as, for example, neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethylhexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol and hydrogenated bisphenol A. For example, the curable polyester resins may comprise the residues of neopentyl glycol in combination with TMCD.

In addition to diacid and diol residues, the curable polyester comprises about 2 to about 40 mole percent of the residues of one or more polyols, based on the total moles of diol and polyol residues. These polyols may include aliphatic, alicyclic, and aryl alkyl polyols. Some specific examples of polyols include, but are not limited to, trimethylolpropane (TMP), pentaerythritol (PE), trimethylolethane (TME), erythritol, threitol, dipentaerythritol, sorbitol, glycerine, and the like. In one example, the curable polyester can comprise about 3 to about 30 mole percent of the residues of one or more polyols chosen from trimethylolpropane, pentaerythritol, trimethylolethane, erythritol, threitol, dipentaerythritol, sorbitol, and glycerine. In another embodiment, the curable polyester comprises trimethylolpropane.

The curable polyester of this invention has a hydroxyl number of about 20 to about 300 mg KOH/g resin. Further examples of hydroxyl number are about 25 to about 275, and about 30 to about 250. In addition, the curable polyester has an acid number of about 0 to about 80 mg KOH/g polyester or, in other examples, about 2 to about 25 mg KOH/g polyester, and about 2 to about 15 mg KOH/g polyester. The number average molecular weight of the curable polyester is about 500 Daltons to about 10,000 daltons. Additional examples of molecular weight ranges are about 700 to about 7000 daltons, and about 800 to about 5000 daltons. The curable polyester has a glass transition temperature (abbreviated herein as "Tg") of about −35 to about 50° C. Some additional, representative examples of Tg ranges are about −35 to less than 50° C., about −35 to about 49° C., about −35 to about 48° C., about −35 to about 47° C., about −35 to about 46° C., about −35 to about 45° C., and about −35 to about 40° C.

Other representative compositions of the curable polyesters of the present invention are those comprising: about 20 to about 80 mole percent, based on the total moles of diacid residues, of the residues of isophthalic acid and about 80 to about 20 mole percent of the residues of adipic acid; about 10 to 100 mole percent, based on the total moles of diol residues, of the residues of 2,2,4,4-tetramethyl-1,3-cyclobutanediol; and about 2 to about 40 mole percent of the residues of a polyol, based on the total moles of diol and polyol residues in which the curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester. This polyester should be understood to include the various embodiments of diacids, diols, polyols, acid and hydroxyl numbers, and glass transition temperatures described previously. For example, the curable polyester may comprise about 40 to about 60 mole percent of the residues of 2,2,4,4-tetramethyl-1,3-cyclobutanediol, about 60 to about 40 mole percent of the residues of neopentyl glycol and about 2 to about 40 mole percent of the residues of at least one polyol chosen from trimethylolpropane, pentaerythritol, trimethylolethane, erythritol, and dipentaerythritol. In another example, the curable polyester may comprise about 50 mole percent of the residues of isophthalic acid, about 50 mole percent of the residues of adipic acid, about 50 mole percent of the residues of 2,2,4,4-tetramethyl-1,3-cyclobutanediol, about 50 mole percent of the residues of neopentyl glycol, and about 10 mole percent of the residues of trimethylolpropane. In another example, the curable polyester may further comprise the residues of a monocarboxylic acid chosen from benzoic acid, acetic acid, propionic acid, tert-butyl benzoic acid, butanoic acid, trimellitic anhydride; or a mixture thereof. In yet another example, the curable polyester can comprise about 50 to 100 mole percent of the residues of isophthalic acid, 0 to about 50 mole percent of the residues of adipic acid, 100 mole percent of the residues of 2,2,4,4-tetramethyl-1,3-cyclobutanediol, and about 10 mole percent of the residues of trimethylolpropane. In this embodiment, the curable polyester can have a hydroxyl number of about 30 to about 250 mg potassium hydroxide per gram of polyester, an acid number of about 2 to about 15 mg potassium hydroxide per gram of polyester, a number average molecular weight of about 700 to about 7000 daltons, and a Tg of about −20 to about 50° C.

A further aspect of the invention is a curable polyester, consisting essentially of:
i. diacid residues, consisting essentially of about 20 to 100 mole percent, based on the total moles of diacid residues, of the residues of isophthalic acid;
ii. diol residues, consisting essentially of about 10 to 100 mole percent, based on the total moles of diol residues, of the residues of 2,2,4,4-tetramethyl-1,3-cyclobutanediol; and
iii. about 2 to about 40 mole percent of the residues of at least one polyol, based on the total moles of diol and polyol residues;
wherein the curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester. The phrase "consisting essentially of", as used herein is intended to encompass curable polyesters having components (i)-(iii) listed above and is understood to exclude any elements that would substantially alter the essential properties of the polyester to which the phrase refers. For example, the diacid and diol residues may include other components that do not alter the solubility of the curable polyester. For example, the addition of 50 mole percent or greater of the residues of a diol or diacid that is known in the art to increase the crystallinity and reduce the solubility of a polyester polymer would be excluded from this embodiment. Some representative classes of diacids and diols that would be expected to increase crystallinity and reduce solubility include, but are not limited to, para-substituted aromatic diol or diacid components, multinuclear aromatic diacids or diols, and alicyclic diols and diacids in which the diol and diacid groups have a 1,4 substitution pattern or "para" relationships to each other. Some examples of diacid and diol components that would be excluded from this embodiment are the residues of terephthalic acid at 50 mole percent or greater, 1,6-naphthalene dicarboxylic acid at 50 mole percent or greater, 1,4-cyclohexanedicarboxylic acid at 75 mole percent or greater, bisphenol A at 50 mole percent or greater, 1,4-cyclohexanedimethanol at 75 mole percent or greater, and hydrogenated bisphenol A at 50 mole percent or greater. All mole percentages are based upon the total moles of diacid or diol residues.

By contrast, some examples of compositions that would be included in the above embodiment are those, for example, wherein the diacid component consists essentially of about 20 to about 80 mole percent of the residues of isophthalic acid and about 80 to about 20 mole percent of the residues of adipic acid, and the diol component consists essentially of about 20 to 100 mole percent of the residues of 2,2,4,4-tetramethyl-1,3-cyclobutanediol. In another example, the diacid component can consist essentially of about 30 to about 70 mole percent of the residues of isophthalic acid and about 70 to about 30 mole percent of the residues of adipic acid, and the diol component consists essentially of about 20 to 100 mole percent of the residues of 2,2,4,4-tetramethyl-1,3-cyclobutanediol. In another example, the diacid component can consist essentially of about 40 to about 60 mole percent of the residues of isophthalic acid and about 60 to about 40 mole percent of the residues of adipic acid. As described previously, the diacid component may further consist essentially of up to 20 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, succinic acid, 2,6-naphthalenedicarboxylic acid, and glutaric acid.

In addition to 2,2,4,4-tetramethyl-1,3-cyclobutanediol, the diol component can consist essentially of up to 50 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

The curable polyester can have a glass transition temperature (abbreviated herein as "Tg") of about −35 to about 50° C. Some additional examples of Tg ranges are about −35 to about 49° C., about −35 to about 48° C., about −35 to about 47° C., about −35 to about 46° C., about −35 to about 45° C., and about −35 to about 40° C.

The curable polyester can be prepared by heating the reactants until the desired molecular weight, acid number, or hydroxyl number is reached. Our invention, therefore, also provides a process for the preparation of a curable polyester, comprising heating a mixture comprising:
i. a diol component comprising about 10 to 100 mole percent of 2,2,4,4-tetramethyl-1,3-cyclobutanediol, based on the total moles of diol component;
ii. a diacid component comprising about 20 to 100 mole percent, based on the total moles of diacid component, of isophthalic acid;
iii. about 2 to about 40 mole percent of a polyol component, based on the total moles of diol and polyol components; and
iv. a catalyst at a temperature of about 150 to about 250° C. while recovering water from the mixture to produce a curable polyester having number average molecular weight of about 500 to 10,000 daltons, a glass transition temperature of about −35° C. to about 50° C., a hydroxyl number of about 20 to about 300 mg potassium hydroxide/g of polyester, or an acid number of 0 to about 80 mg potassium hydroxide/g of polyester.

The reaction can be monitored by the collection of water (when diacids are used as starting materials) or alcohol (when diesters are used). The polyester typically can be prepared at a temperature range of about 150 to about 250° C. at atmospheric pressure or under vacuum. In one embodiment, for example, the diacid and diol components of the polyester may be partially reacted before the polyol is added. Once the polyol is added to the reaction mixture, heating is continued until a target acid number is satisfied.

It will be apparent to persons skilled in the art, that the curable polyester prepared by our process may comprise the various embodiments of diacids, diols, polyols, acid and hydroxyl numbers, and glass transition temperatures described previously. For example, the diacid component can comprise about 20 to about 80 mole percent of isophthalic acid and about 80 to about 20 mole percent adipic acid, and the diol component can comprise about 20 to 100 mole percent 2,2,4,4-tetramethyl-1,3-cyclobutanediol. In another example, the diacid component can comprise about 30 to about 70 mole percent of isophthalic acid and about 70 to about 30 mole percent adipic acid, and diol component can comprise about 20 to 100 mole percent 2,2,4,4-tetramethyl-1,3-cyclobutanediol. In another example, the diacid component can comprise about 40 to about 60 mole percent isophthalic acid and about 60 to about 40 mole percent adipic acid. In yet another example, the diacid component can further comprise up to 20 mole percent of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, succinic acid, 2,6-naphthalenedicarboxylic acid, and glutaric acid.

In addition to 2,2,4,4-tetramethyl-1,3-cyclobutanediol, the diol component can comprise up to 50 mole percent of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethylhexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

The curable polyester can have a glass transition temperature (abbreviated herein as "Tg") of about −35 to about 50° C. Some additional examples of Tg ranges are about −35 to about 49° C., about −35 to about 48° C., about −35 to about 47° C., about −35 to about 46° C., about −35 to about 45° C., and about −35 to about 40° C.

As described previously, the polyol component can comprise about 3 to about 30 mole percent of at least one polyol chosen from trimethylolpropane, pentaerythritol, trimethylolethane, erythritol, threitol, dipentaerythritol, sorbitol, and glycerine. For example, in one embodiment, the diol component can comprise about 40 to about 60 mole percent of the residues of 2,2,4,4-tetramethyl-1,3-cyclobutanediol and about 60 to 40 mole percent neopentyl glycol; the polyol component can comprise about 2 to about 40 mole percent of at least one polyol chosen from trimethylolpropane, pentaerythritol, trimethylolethane, erythritol, and dipentaerythritol, and the catalyst can comprise a tin compound. In yet another embodiment the polyol comprises trimethylolpropane.

Alternatively, the curable polyester can be prepared in the presence of a process solvent to help remove the water or alcohol by-products of the reaction and to promote the synthesis of the polyester resin. The process solvent may be any solvent known in the art as useful for the preparation of polyester polymers. For example, the process solvent can be a hydrocarbon solvent. In another example, the process solvent can comprise an aromatic hydrocarbon such as, for example, xylene. The xylene can be a pure isomer, or a mixture of ortho, meta, and para isomers. The amount of process solvent added may be determined by routine experimentation as understood by those skilled in the art. The process solvent can be added in amounts ranging from about 0.5 to about 5 weight percent, based on the total weight of reaction mixture.

Optionally, a catalyst may be used to promote the synthesis of the polyester. The catalyst may be any catalyst known in the art to be useful for the formation of polyester polymers. For example, the catalyst can be a tin catalyst, such as, for example, FASCAT™ 4100 (available from Arkema Corporation). The catalyst increases the rate of the polyester resin reaction, and its amount may be determined by routine experimentation as understood by those skilled in the art. Ordinarily, the catalyst is added in amounts ranging about 0.01 to about 1.00 weight percent based on the total weight of the reactants.

Our invention also provides a coating composition comprising the various embodiments of the curable polyester resin containing 2,2,4,4-tetramethyl-1,3-cyclobutanediol (TMCD) as described above. Thus, another aspect of the present invention is a thermosetting coating composition, comprising:
(A). about 50 to about 90 weight percent, based on the total weight of (A) and (B) of a curable polyester, comprising
  i. diacid residues, comprising about 20 to about 80 mole percent, based on the total moles of diacid residues, of the residues of an aromatic diacid and about 80 to about 20 mole percent of the residues of an aliphatic diacid, alicyclic diacid, or a combination thereof;

ii. diol residues, comprising about 10 to 100 mole percent, based on the total moles of diol residues, of the residues of 2,2,4,4-tetramethyl-1,3-cyclobutanediol; and iii. about 2 to about 40 mole percent of the residues of at least one polyol, based on the total moles of diol and polyol residues;

wherein the curable polyester has a number average molecular weight of about 500 to 10,000 daltons, a glass transition temperature of about −35° C., to about 50° C., a hydroxyl number of about 20 to about 300 mg KOH/g of polyester, and an acid number of 0 to about 80 mg KOH/g of polyester;

(B). about 10 to about 50 weight percent, based on the total weight of (A) and (B) of at least one crosslinker comprising at least one compound reactive with a carboxylic acid or a hydroxyl group;

(C). about 10 to about 60 weight percent, based on the total weight of (A), (B), and (C) of at least one solvent.

It is understood that the curable polyester component of the coating composition may include any combination of the various embodiments of diacids, diols, polyols, acid and hydroxyl numbers, and glass transition temperatures described hereinabove in accordance with the present invention. In one aspect, the aromatic diacid can comprise phthalic acid, terephthalic acid, isophthalic acid, 2,6-naphthalenedicarboxylic acid, or combinations thereof; the aliphatic diacid can comprise adipic acid, dodecanedioic acid, sebacic acid, azelaic acid, glutaric acid, maleic acid, fumaric acid, succinic acid, or combinations thereof; and the alicyclic diacid can comprise 1,4-cyclohexanedicarboxylic acid, 1,3-cyclohexanedicarboxylic acid, hexahydrophthalic acid, tetrahydrophthalic acid, or combinations thereof. In another embodiment, the diacid residues, can comprise about 20 to about 80 mole percent, based on the total moles of diacid residues, of the residues of isophthalic acid and about 80 to about 20 mole percent of the residues of adipic acid; and the diol residues can comprise about 10 to 100 mole percent, based on the total moles of diol residues, of the residues of 2,2,4,4-tetramethyl-1,3-cyclobutanediol.

In yet another embodiment of our coating composition, the curable polyester comprises:

i. diacid residues, comprising about 20 to 100 mole percent, based on the total moles of diacid residues, of the residues of isophthalic acid;

ii. diol residues, comprising about 10 to 100 mole percent, based on the total moles of diol residues, of the residues of 2,2,4,4-tetramethyl-1,3-cyclobutanediol; and iii. about 2 to about 40 mole percent of the residues of at least one polyol, based on the total moles of diol and polyol residues;

wherein the curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester. In another example, the curable polyester can comprise about 30 to 100 mole percent of the residues of isophthalic acid. In yet another example, the diacid residues comprise about 30 to about 70 mole percent of the residues of isophthalic acid, about 70 to about 30 mole percent adipic acid. In still another example, the diacid residues can comprise about 40 to about 60 mole percent of the residues of isophthalic acid and about 60 to about 40 mole percent of the residues of adipic acid.

In another example, the curable polyester may comprise diacid residues comprising about 20 to about 80 mole percent isophthalic acid, about 80 to about 20 mole percent adipic acid, and 0 to about 30 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, succinic acid, 2,6-naphthalenedicarboxylic acid, and glutaric acid, and diol residues comprising about 20 to 100 mole percent of the residues of 2,2,4,4-tetramethyl-1,3-cyclobutanediol. In another example, the curable polyester can comprise diacid residues comprising about 30 to about 70 mole percent of the residues of isophthalic acid and about 70 to about 30 mole percent of the residues of adipic acid, and diol residues comprising about 20 to 100 mole percent of the residues of 2,2,4,4-tetramethyl-1,3-cyclobutanediol. In another example, the curable polyester can comprise diacid residues comprising about 40 to about 60 mole percent of the residues of isophthalic acid and about 60 to about 40 mole percent of the residues of adipic acid. In yet another example, the curable polyester further comprises up to 30 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, succinic acid, 2,6-naphthalenedicarboxylic acid, and glutaric acid.

In addition to 2,2,4,4-tetramethyl-1,3-cyclobutanediol, the diol residues can comprise up to 90 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A. As described previously, the curable polyester can comprise about 3 to about 30 mole percent of the residues of at least one polyol chosen from trimethylolpropane, pentaerythritol, trimethylolethane, erythritol, threitol, dipentaerythritol, sorbitol, and glycerine. In one embodiment, for example, the polyester can comprise about 40 to about 60 mole percent of the residues of 2,2,4,4-tetramethyl-1,3-cyclobutanediol and about 60 to 40 mole percent of the residues of neopentyl glycol; about 2 to about 40 mole percent of the residues of at least one polyol chosen from trimethylolpropane, pentaerythritol, trimethylolethane, erythritol, and dipentaerythritol, and a catalyst comprising a tin compound. In another example, the polyol comprises trimethylolpropane. In yet another example, the curable polyester may comprise about 3 to about 30 mole percent of the residues of one or more polyols chosen from trimethylolpropane, pentaerythritol, trimethylolethane, erythritol, threitol, dipentaerythritol, sorbitol, and glycerine.

Other representative examples of the coating composition of our invention include, but are not limited to, those in which the curable polyester comprises (i) diol residues comprising about 40 to about 60 mole percent of the residues of 2,2,4,4-tetramethyl-1,3-cyclobutanediol, about 60 to 40 mole percent of the residues of neopentyl glycol and about 2 to about 40 mole percent of the residues of at least one polyol chosen from trimethylolpropane, pentaerythritol, trimethylolethane, erythritol, and dipentaerythritol; (ii) diacid residues comprising about 50 mole percent of the residues of isophthalic acid, about 50 mole percent of the residues of adipic acid; diol residues comprising about 50 mole percent of the residues of 2,2,4,4-tetramethyl-1,3-cyclobutanediol; about 50 mole percent of the residues of neopentyl glycol, and about 10 mole percent of the residues of trimethylolpropane; and (iii) diacid residues comprising about 50 to 100 mole percent of the residues of isophthalic acid, 0 to about 50 mole percent of the residues of adipic acid; about 100 mole percent of the residues of 2,2,4,4-tetramethyl-1,3-cyclobutanediol; and about 10 mole percent of the residues of trimethylolpropane; wherein the curable polyester has a hydroxyl number of about 30 to about 250 mg potassium hydroxide per gram of polyester, an acid number of about 2 to about 15 mg potassium hydroxide per gram of polyester, a number average molecular weight of about 700 to about 7000 daltons, and a Tg of about −20 to about 50° C. Other examples of Tg ranges for the curable polyester are about −35 to about 49° C., −35 to about 48° C., about −35 to about 47° C., about −35 to about 46° C., about −35 to about 45° C., and about −35 to about 40° C.

The thermosetting coating composition may further contain about 10 to about 50 weight percent of one or more crosslinkers, based on the combined weight of the polyester and the crosslinker. Typically, the crosslinker will be a compound, generally known in the art, that can react with either a carboxylic acid-terminated or hydroxyl-terminated polyester resin. For example, crosslinker can comprise at least one compound chosen from epoxides, melamines, hydroxy alkyl amides, isocyanates, and isocyanurates. In another example, epoxide crosslinkers will react with a carboxylic acid-terminated polyester resin, whereas melamines, isocyanates, and isocyanurates will react with a hydroxyl-terminated polyesters.

Representative epoxide crosslinkers include epoxy resins containing bisphenol A epoxy novolac resins, epoxy resins containing hydrogenated bisphenol A, epoxy resins containing bisphenol F, triglycidylisocyanurate, and combinations of these crosslinkers. Some of these compounds are available commercially such as, for example, those epoxides under the EPON™ trademark from Hexion Specialty Chemicals and those epoxides under the ARALDITE™ trademark from Huntsman Advanced Materials.

Melamine or "amino" type crosslinkers also are well-known in the art and can be used in the coating composition of the invention. For example, the coating composition of the present invention can comprise at least one melamine compound chosen from hexamethoxymethylmelamine, tetramethoxymethylbenzoguanamine, tetramethoxymethylurea, and mixed butoxy/methoxy substituted melamines. Some examples of commercially available melamine crosslinkers include the CYMEL™ 300 series and CYMEL™ 1100 series melamine crosslinkers, available from Cytec Surface Specialties. The polyester to melamine weight ratio is typically about 50:50 to about 90:10. Other examples of polyester:melamine weight ratios are about 60:40 to about 85:15 and about 65:35 to about 80:20.

In addition to epoxides and melamines, isocyanates and isocyanurates can be used as crosslinkers in accordance with the invention. Representative isocyanates and isocyanurates include, but are not limited to, toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, and methylene bis(4-cyclohexyl isocyanate), isophorone diisocyanate.

The coating composition also can comprise isocyanate-terminated adducts of diols and polyols, such as ethylene glycol, 1,4-butylene glycol, trimethylol propane, etc., as crosslinkers. These crosslinkers are formed by reacting more than one equivalent of a diisocyanate, such as those mentioned above, with one equivalent of a diol or polyol to form a higher molecular weight isocyanate prepolymer with a isocyanate functionality of 2 to 3. Some commercial examples of isocyanate-terminated adducts include isocyanate crosslinkers under the DESMODUR™ and MONDUR™ trademarks, available from Bayer Material Science.

In one embodiment of the invention, the crosslinker comprises one or more aliphatic isocyanates, which can provide good outdoor durability and color stability in the cured coating. Examples of aliphatic isocyanates include 1,6-hexamethylene diisocyanate, 1,4-butylene diisocyanate, methylene bis (4-cyclohexyl isocyanate), isophorone diisocyanate, and yet another combinations thereof. Mixtures of isocyanate crosslinkers can also be employed. For example, the crosslinker can comprise isocyanurates of 1,6-hexamethylene diisocyanate, the biuret of 1,6-hexamethylene diisocyanate, or a mixture thereof.

Stoichiometric calculations for the curable polyester and isocyanate reaction are known to those skilled in the art and are described in *The Chemistry of Polyurethane Coatings*, Technical Publication p. 20, by Bayer Material Science, 2005. Persons having ordinary skill in the art will understand that crosslinking between the polyester resin and isocyanate reaches maximum molecular weight and optimal properties at an isocyanate:hydroxyl equivalent ratio of about 1:1; that is, when one equivalent of isocyanate (—NCO) reacts with one equivalent of hydroxyl (—OH). Typically, however, a small excess of isocyanate, for example, about 5-10% above a 1:1 equivalent, is used to allow for the loss of isocyanate by the reaction with adventitious moisture from the atmosphere, solvents, and pigments. Other NCO:OH ratios can be used; for example, it may be desirable to vary the NCO to OH ratio to less than 1:1 to improve flexibility or greater than 1:1 to produce harder, more chemical resistant, and more weather resistant coatings.

For the present invention, the coating composition typically has an NCO:OH ratio, on an equivalent basis, of about 0.9:1.0 to about 1.5:1.0. Examples of other NCO:OH ratios are about 0.95:1.0 to about 1.25:1.0 and about 0.95:1.0 to about 1.1:1.0.

The thermosetting coating composition also comprises about 10 to about 60 weight percent, based on the total weight of components (A), (B), and (C) of a solvent. Examples of solvents include benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate (available commercially from Eastman Chemical Co. under the trademark TEXANOL™), or combinations thereof. The coating composition also may comprise reactive solvents such as, for example, diallyl phthalate, SANTOLINK™ XI-100 polyglycidyl alyl ether (available from Cytec), and others as described, for example, in U.S. Pat. Nos. 5,349,026 and 5,371,148.

The coating composition, optionally, can further comprise at least one crosslinking catalyst. Representative crosslinking catalysts include from carboxylic acids, sulfonic acids, tertiary amines, tertiary phosphines, tin compounds, or combinations of these compounds. Some specific examples of crosslinking catalysts are one or more compounds chosen from p-toluenesulfonic acid, dodecylbenzene sulfonic acid, dinonylnaphthalene sulfonic acid, and dinonylnaphthalene disulfonic acid, benzoic acid, triphenylphosphine, dibutyltindilaurate, and dibutyltindiacetate. The crosslinking catalyst can depend on the type of crosslinker that is used in the coating composition. In one embodiment of the invention, for example, the crosslinker can comprise an epoxide, and the crosslinking catalyst can comprise at least one compound chosen from p-toluenesulfonic acid, benzoic acid, tertiary amines, and triphenylphosphine. In another example, the crosslinker can comprise a melamine or "amino" crosslinker and the crosslinking catalyst can comprise p-toluenesulfonic acid, unblocked and blocked dodecylbenzene sulfonic acid (abbreviated herein as "DDBSA"), dinonylnaphthalene sulfonic acid (abbreviated herein as "DNNSA") and dinonylnaphthalene disulfonic acid (abbreviated herein as "DNNDSA"). Some of these catalysts are available commercially under trademarks such as, for example, NACURE™ 155, 5076, 1051, and 5225 (available from King Industries), BYK-CATALYSTS™ (available from BYK-Chemie USA), and CYCAT™ catalysts (available from Cytec Surface Specialties).

In another embodiment, the curable polyester can comprise hydroxyl-terminated end groups and the crosslinker can comprise an isocyanate. The coating composition also can comprise one or more isocyanate crosslinking catalysts such as, for example, FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC-6212™ non-tin catalysts (available from King Industries), and tertiary amines.

In yet another embodiment of the invention, the thermosetting coating composition comprises about 25 to about 35 weight percent solvent, about 20 to about 35 weight percent of a melamine crosslinker, and a crosslinking catalyst comprising p-toluenesulfonic acid. In another example, the thermosetting coating composition comprises about 25 to about 35 weight percent solvent and about 20 to about 35 weight percent hexamethoxy-methylmelamine.

The coating composition of this invention may further contain one or more coating additives known in the art. Examples of coating additives include, but are not limited to, leveling, rheology and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in the *Raw Material Index and Buyer's Guide*, published by the National Paint & Coatings Association, 1500 Rhode Island Avenue, N.W., Washington., DC 20005. Further examples of such additives may be found in U.S. Pat. No. 5,371,148.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl)sulfosuccinate, di(2-ethyl hexyl)sodium sulfosuccinate, sodium dihexylsulfosuccinate, sodium dicyclohexyl sulfosuccinate, diamyl sodium sulfosuccinate, sodium dusobutyl sulfosuccinate, disodium isodecyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Several proprietary antifoaming agents are commercially available and include, but are not limited to, BUBREAK™, available from Buckman Laboratories Inc., BYK™, available from BYK Chemie, U.S.A., FOAMASTER™ and NOPCO™, available from Henkel Corporation Coating Chemicals, DREWPLUS™, available from the Drew Industrial Division of Ashland Chemical Company, TROYSOL™ and TROYKYD™, available from Troy Chemical Corporation, and SAG™, available from Union Carbide Corporation.

Some examples of UV absorbers and UV light stabilizers are substituted benzophenone, substituted benzotriazoles, hindered amines, and hindered benzoates, available from Cytec Specialty Chemicals as CYASORB® UV, and available from Ciba Specialty Chemicals as TINUVIN®; diethyl-3acetyl-4-hydroxy-benzyl-phosphonate, 4-dodecyloxy-2-hydroxy benzophenone, and resorcinol monobenzoate.

The paint or coating additives as described above form a relatively minor proportion of the coating composition, generally about 0.05 weight percent to about 5.00 weight percent. A coating composition optionally may contain one or more of the above-described additives and one or more pigments.

The solvent borne thermosetting coating composition, as described above, also may comprise at least one pigment. Typically, the pigment is present in an amount of about 20 to about 60 weight percent, based on the total weight of the composition. Examples of pigments include those generally recognized by persons of ordinary skill in the art of surface coatings. For example, the pigment may be a typical organic or inorganic pigment, especially those set forth in the Colour Index, 3rd ed., 2nd Rev., 1982, published by the Society of Dyers and Colourists in association with the American Association of Textile Chemists and Colorists. Other examples of suitable pigments include titanium dioxide, barytes, clay, calcium carbonate, CI Pigment White 6 (titanium dioxide), CI Pigment Red 101 (red iron oxide), CI Pigment Yellow 42, CI Pigment Blue 15, 15:1, 15:2, 15:3, 15:4 (copper phthalocyanines); CI Pigment Red 49:1 and CI Pigment Red 57:1. Colorants such as, for example, phthalocyanine blue, molybdate orange, or carbon black also may be added to the coating composition. For example, the solventborne, thermosetting coating formulations can contain titanium dioxide as the pigment.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., about 0.5 to about 4 mils of wet coating onto a substrate. The coating can be cured at ambient (room) temperature or heated in a forced air oven to a temperature of about 50° C. to about 175° C., for a time period that typically ranges about 5 to about 90 minutes and allowed to cool. Further examples of typical application and curing methods can be found in U.S. Pat. Nos. 4,737,551 and 4,698,391 and 3,345,313. The invention is further illustrated by the following examples.

EXAMPLES

Preparation of Polyester Resins and Resulting Properties

Comparative and example polyester resins were prepared according to the following procedure, targeting a number average molecular weight=1250 daltons, a hydroxyl equivalent weight=500 g resin/eq OH, a hydroxyl functionality=2.5 and final acid number=8 mg KOH/g polyester. These resins are listed in Tables 1 and 2. The resins were prepared using a solvent process to help remove the water of esterification. The resins were prepared in 2 stages in a two-liter reaction kettle equipped with a heating mantle, mechanical stirrer, thermocouple, nitrogen blanket (0.6 scfh), oil-heated partial condenser, operated at a temperature of 103° C.-105° C., condensate trap, and water-cooled total condenser, operated at a temperature of about 15° C. The condensate trap, kettle top and adapter from the kettle to the column were insulated with aluminum foil and fiber glass tape to facilitate water removal. In stage 1, raw materials were charged to the reactor. Additional xylene (≈30 g) was used to fill the moisture trap. The temperature was then increased from room temperature to 150° C. over ninety minutes to form a homogenous melt. Agitation (300 rpm) was started and the temperature increased to a maximum of 230° C. over 240 minutes. In stage 2, trimethylolpropane ("TMP") was added when half the theoretical condensate was collected. The reaction mixture was held at 230° C. until a final acid number of 6±2 mg KOH/g resin was obtained. The resins were then poured into a metal paint can.

The acid number, number average molecular weight ("Mn"), and glass transition temperature ("Tg") of each resin were determined and are shown in Tables 1 and 2. Acid number was determined using ASTM method 1639. Hydroxyl number was determined by esterifying the resin by reaction with excess acetic anhydride in pyridine and then decomposing the unreacted anhydride with water. The resulting acetic acid is then titrated with a standard solution of KOH. The milligrams KOH required to neutralize the acetic acid released from one gram of resin sample in the above procedure is reported as the hydroxyl number. Number average molecular weight was determined by gel permeation chromatography (Agilent 1100 Series GPC-SEC system) with a refractive index detector and polystyrene standards.

Residual xylene remaining in the polyester from the resin forming reaction could artificially lower the Tg measurement. To obtain a more accurate Tg, a resin sample was first subjected to preconditioning in a thermal gravimetric analysis ("TGA") instrument. The resin sample was placed into a stainless steel differential scanning calorimeter ("DSC") pan and heated under nitrogen atmosphere from room temperature to 150° C. at a rate of 5° C./min. The sample was then transferred to a differential scanning calorimeter with modulating capability (TA Instruments Q2000 MDSC with Universal software V4.3A). On the first heating cycle, the sample was heated under nitrogen atmosphere from −120° C. to 125° C. at a rate of 5° C./min and a modulation rate of ±0.796° C./min. Next, it was cooled to −120° C. at 5° C./min and a modulation rate of ±0.796° C./min. For the second heating cycle, the sample was heated under the same conditions as those used in the first heating cycle. The midpoint of the second heating cycle is reported as the Tg of the sample.

Each resin was reduced to 70 weight percent solids in n-butyl acetate ("n-BuOAc"). The solutions were then evaluated for color and haze. Platinum-Cobalt color was measured with a Gardco LICO 100 colorimeter using method ASTM D 1209. Percent haze was measured with a BYK-Gardner hazegard plus instrument using ASTM method D 1003, Method A.

Comparative resins P1 and P2 contain neopentyl glycol ("NPG") with high isophthalic acid ("IPA") content. They exhibit poor solubility and result in opaque solids that are unsuitable for formulating into a coating. Comparative resin P3 contains NPG with a higher aliphatic acid ("AD") content. The resin exhibits good solubility and is suitable for formulating into a coating. Comparative resins P4, P5, P6 and P7 show decreasing solubility as NPG is substituted incrementally with 1,4-cyclohexanedimethanol ("CHDM"). Higher amounts of CHDM result in a hazy solution to opaque semi-solids. Example resins P8, P9, P10, P11, and P12 show good solubility as NPG is substituted incrementally with TMCD relative to comparative resin P3.

TABLE 1

Comparative Polyester Resin Charge Weights (Grams) and Determined Resin Properties

| Polyester Formulation | Type | | | | | | |
| --- | --- | --- | --- | --- | --- | --- | --- |
| | Comparative P1 | Comparative P2 | Comparative P3 | Comparative P4 | Comparative P5 | Comparative P6 | Comparative P7 |
| Stage 1 | | | | | | | |
| NPG$^{(a),(b)}$ | 422.76 | 429.74 | 440.11 | 316.44 | 201.64 | 96.98 | — |
| CHDM$^{(a),(c)}$ | — | — | — | 146.06 | 279.18 | 402.83 | 516.29 |
| TMP$^{(d)}$ | 35.93 | 35.99 | 36.35 | 36.05 | 36.73 | 36.46 | 36.64 |
| IPA$^{(e)}$ | 647.26 | 526.82 | 338.11 | 323.2 | 309.72 | 297.09 | 285.55 |
| AD$^{(f)}$ | — | 115.85 | 297.41 | 284.29 | 272.43 | 261.32 | 251.18 |

TABLE 1-continued

Comparative Polyester Resin Charge Weights (Grams) and Determined Resin Properties

| Polyester Formulation | Comparative P1 | Comparative P2 | Comparative P3 | Comparative P4 | Comparative P5 | Comparative P6 | Comparative P7 |
|---|---|---|---|---|---|---|---|
| Fascat 4100 catalyst[g] | 1.14 | 1.14 | 1.14 | 1.14 | 1.13 | 1.13 | 1.12 |
| Xylene process solvent | 22.75 | 22.8 | 22.88 | 22.75 | 22.63 | 22.52 | 22.42 |
| Stage 2 | | | | | | | |
| TMP | 35.93 | 35.99 | 36.35 | 36.05 | 36.73 | 36.46 | 36.64 |
| Total Charge | 1165.77 | 1168.33 | 1172.35 | 1165.98 | 1160.19 | 1154.79 | 1149.84 |
| Minus Theo. Condensate | 137.70 | 140.13 | 143.97 | 137.5 | 131.67 | 126.19 | 121.19 |
| Yield | 1028.07 | 1028.2 | 1028.38 | 1028.48 | 1028.52 | 1028.6 | 1028.65 |
| Determined Resin Properties | | | | | | | |
| AN (mg KOH/g resin) | 6 | 6 | 5 | 5 | 6 | 5 | 7 |
| OH# (mg KOH/g resin) | 106 | 105 | 102 | 106 | 107 | 109 | 109 |
| $M_n$ (Daltons) | 1988 | 2033 | 1906 | 2048 | 2046 | 1992 | 1779 |
| $T_g$ (° C.) | 36.8 | 14.5 | −14.0 | −10.4 | −7.2 | −7.4 | −7.8 |
| Resin Properties at 70 wt. % in n-BuOAc | | | | | | | |
| Platinum-Cobalt Color | opaque (solid) | opaque (semi-solid) | 3 | 18 | 17 (hazed w/in 45 days) | opaque (semi-solid) | opaque (semi-solid) |
| Solubility (% Haze) | opaque (solid) | opaque (semi-solid) | 1.15 | 0.84 | 0.87 (hazed w/in 45 days) | opaque (semi-solid) | opaque (semi-solid) |
| Suitable for Coating (Yes/No) | no | no | yes | yes | no | no | no |

[a]Includes a glycol excess of 1 wt. % based on calculated charge weights.
[b]2,2-Dimethyl-1,3-propanediol (Eastman).
[c]1,4-Cyclohexanedimethanol (Eastman).
[d]Trimethylolpropane (Perstorp).
[e]Isophthalic acid (Eastman).
[f]Adipic acid (DuPont).
[g]Butylstannoic acid (Arkema).

TABLE 2

Example Polyester Resin Charge Weights (Grams) and Determined Resin Properties

| Polyester Formulation | Example P8 | Example P9 | Example P10 | Example P11 | Example P12 |
|---|---|---|---|---|---|
| Stage 1 | | | | | |
| NPG[a],[b] | 313.31 | 199.64 | 96.02 | — | — |
| TMCD[a],[c] | 144.61 | 276.42 | 398.84 | 511.18 | 500.89 |
| TMP[d] | 36.05 | 36.73 | 36.46 | 36.64 | 36.36 |
| IPA[e] | 323.2 | 309.72 | 297.09 | 285.55 | 446.58 |
| AD[f] | 284.29 | 272.43 | 261.32 | 251.18 | 98.21 |
| Fascat 4100 catalyst[g] | 1.14 | 1.13 | 1.13 | 1.12 | 1.12 |
| Xylene process solvent | 22.75 | 22.63 | 22.52 | 22.42 | 22.37 |
| Stage 2 | | | | | |
| TMP | 36.05 | 36.73 | 36.46 | 36.64 | 36.36 |
| Total Charge | 1165.98 | 1160.19 | 1154.79 | 1149.84 | 1146.9 |
| Minus Theo. Condensate | 137.5 | 131.67 | 126.19 | 121.19 | 118.41 |
| Yield | 1028.48 | 1028.52 | 1028.6 | 1028.65 | 1028.49 |
| Determined Resin Properties | | | | | |
| AN (mg KOH/g resin) | 5 | 5 | 4 | 5 | 5 |
| OH# (mg KOH/g resin) | 97 | 98 | 93 | 89 | 93 |

TABLE 2-continued

Example Polyester Resin Charge Weights (Grams) and Determined Resin Properties

| Polyester Formulation | Type | | | | |
|---|---|---|---|---|---|
| | Example P8 | Example P9 | Example P10 | Example P11 | Example P12 |
| $M_n$ (Daltons) | 2046 | 2113 | 2138 | 2208 | 2416 |
| $T_g$ (° C.) | −8.0 | −1.5 | 5.9 | 14.1 | 43.8 |
| Resin Properties at 70 wt. % in n-BuOAc | | | | | |
| Platinum-Cobalt Color | 5 | 4 | 13 | 7 | 40 |
| Solubility (% Haze) | 0.53 | 0.56 | 0.92 | 0.92 | 2.40 |
| Suitable for Coating (Yes/No) | yes | yes | yes | yes | yes |

(a)Includes a glycol excess of 1 wt. % based on calculated charge weights.
(b)2,2-Dimethyl-1,3-propanediol (Eastman).
(c)2,2,4,4-tetramethyl-1,3-cyclobutanediol (Eastman).
(d)Trimethylolpropane (Perstorp).
(e)Isophthalic acid (Eastman).
(f)Adipic acid (DuPont).
(g)Butylstannoic acid (Arkema).

Preparation of Polyurethane Coatings Crosslinked with the Triisocyanurate of HDI and Resulting Properties White-pigmented polyurethane coating compositions were prepared and are listed in Table 3. The resins were crosslinked with the triisocyanurate of 1,6-hexamethylene diisocyanate at a 1.1:1 NCO:OH equivalent ratio.

The coating compositions were prepared by adding the Part A polyester resin and pigment to a 500-mL stainless steel beaker. A cowles disperser was used to grind the resin and pigment to a 7+ Hegman, which took about 5 min at 5000 rpm. Next, the flow aid was added and thoroughly mixed for a few minutes. Finally, the catalyst and solvent blend were added and thoroughly mixed. The total Part A was transferred into a glass jar and rolled until needed. The Part B crosslinker was added to Part A and thoroughly mixed with a wooden tongue depressor then filtered through a Hayward PE 100 PN164 300M felt paint filter inside a medium mesh paper filter.

Coating viscosity was determined with a Gardco mini Ford dip cup #4 in accordance with ASTM D 1200 "Standard Test Method for Viscosity by Ford Viscosity Cup". The initial viscosity measurement was made after combining and thoroughly mixing Part B with Part A. Viscosity was then measured every two hours thereafter and shown in Table 3.

A wire wound rod was used to apply the coating to glass microscope slides and polished cold rolled steel test panels with Bonderite 1000 pretreatment. The rod was selected to achieve a 1.5±0.2 mil dry film thickness.

The coatings were cured at three different conditions: 1) force-dried 30 minutes at 250° F. (121.1° C.); 2) force-dried 40 minutes at 160° F. (71.1° C.); 3) air-dried 21 days at 70° F. (21.1° C.). Cure schedule 1 is representative of auto OEM applications; cure schedule 2 is representative of applications sensitive to heat, such as plastics and auto refinish; cure schedule 3 is representative of applications where objects are too large to place in an oven, such as maintenance, aircraft and transportation.

With the exception of König pendulum hardness, all of the coating mechanical properties were determined after 21 days ambient aging. The following properties were determined and shown in Tables 4-6: specular gloss, distinctness of image, color, hardness, flexibility, and chemical resistance.

Dry film thickness ("DFT") was measured with a FISCHERSCOPE™ MMS Multi Measuring System permascope (Fischer Technology) using the probe for ferrous substrates. Specular gloss was measured with a BYK-Gardner micro-TRI-gloss meter according to ASTM method D 523. Distinctness of image ("DOI") was measured with a BYK-Gardner wave-scan DOI instrument using ASTM method E 430. Color was measured with a BYK-Gardner spectro-guide sphere gloss meter using ASTM method E 308.

MEK double rub resistance was performed with a 32 oz. ball peen hammer wrapped in 16 layers of cotton cheesecloth using ASTM method D1308. The number passed is reported as the last rub until any breakthrough of the coating to metal was observed. Breakthrough that occurred at the beginning and ending of the hammer stroke where rub direction is reversed was ignored. The test was run to a maximum of 750 double rubs if no breakthrough of the coating was observed.

Hardness was determined by three methods: a BYK-Gardner pendulum hardness tester using ASTM method D 4366; by pencil test using ASTM method D 3363; and with an Instron Wilson-Wolpert Tukon 2100B indentation hardness tester using ASTM method E 384. For pendulum hardness, the Konig method (KPH) is reported. KPH was followed over the course of 21 days. The first measurement, Day 1, was taken 24 hours after cure at the 250° F. (121° C.) and 160° F. (71.1° C.) conditions. For those cured at 70° F. (21.1° C.), the first KPH reading was taken 24 hours after the coating was drawn down. For pencil hardness, the value reported is the last pencil that did not cut through the coating to metal. Tukon hardness was measured on coatings applied to glass microscope slides. The instrument was set to run with a 10 g weight and 13 second indent time using 20× magnification. Tukon hardness is reported using the Knoop scale (HK).

Flexibility was measured as impact resistance with a Gardco Model 172 universal impact tester using ASTM method D 2794. The values reported are the last impact to not produce any crack in the coating film or delamination of the coating from the substrate.

Resistance to a 50% aqueous solution of sulfuric acid was performed under ambient conditions between 21 and 36 days using ASTM method D 1308. A drop of the acid solution was placed onto the coating, covered with a watch glass and sealed with paraffin wax. The test was stopped when a coating within a given cure schedule exhibited damage.

SKYDROL™ phosphate ester (available from Solutia) is a fire resistant aircraft hydraulic fluid. Only the coatings force-dried 30 minutes at 250° F. (121.1° C.) were tested for SKYDROL™ resistance. The resistance of the coating to SKYDROL™ fluid was performed by immersing the bottom third of a coated test panel in SKYDROL™ LD-4 fluid for 14 days at room temperature (approximately 70° F. (21.1° C.)). The test panel was removed and wiped dry using a cotton cloth dampened with heptane. Pencil hardness of the coating was determined before immersion and immediately after immersion in the fluid and after a 24 hour recovery period. A coating is considered to pass the test when the pencil hardness does not drop more than two pencil hardness units.

To gage outdoor durability, the coatings were subjected to QUVA (340 nm) accelerated weathering using a QUV/SE instrument (Q-LAB™). The test condition for 'general metal' coatings per ASTM method D 4587 was selected to include 4 hours UV exposure at 60° C. followed by 4 hours condensation at 50° C. Test panel edges and back were taped to protect against rust formation. Measurements were taken 2 hours into the UV light cycle to ensure a dry surface and consistency of measurement. Test panels were rotated after each observation interval. The coatings were tested for gloss (20° and 60° using ASTM method D 523) and color change (Hunter ΔE* and Yellowness Index, using ASTM method E 308 and using ASTM method D 1925) as shown in Tables 7 through 12.

Table 4 shows MEK double rubs increase as TMCD content in the coating increases at the 250° F. (121.1° C.) cure schedule relative to comparative coating C1. For all coatings, the MEK double rubs tend to decrease as the cure temperature decreases (see Tables 5 and 6). These coatings, however, are still acceptable with double rubs being greater than 150.

Hardness, as measured by pencil and Tukon tests, increases as TMCD content increases relative to comparative coating C1 (see Tables 4-6). At 250° F. (121.1° C.) cure, the KPH greatly increased with TMCD content in the coating (see Table 4). Tables 5 and 6 show that increasing TMCD content gives better early hardness development, particularly over the first two to seven days, for the two lower temperature cure conditions.

Example coatings containing TMCD were less affected by exposure to 50% aqueous $H_2SO_4$ solution, whereas comparative NPG coating C1 blistered in each case (see Tables 4-6). Generally, acid resistance increased as TMCD content in the coating increased at any cure condition.

Table 4 shows that example coating C5 made from polyester P12 (TMCD with high IPA content) was the only coating that retained its pencil hardness after 14 days immersion in SKYDROL™ fluid.

In QUVA (340 nm) accelerated weathering exposure, the example coatings containing TMCD exhibited better gloss retention than comparative NPG coating C1 (see Tables 7, 9 and 11). All of the coatings exhibited low color development with a Hunter ΔE* shift of one or less (see Tables 8, 10 and 12).

TABLE 3

Comparative and Example (Isocyanurate Crosslinked) Polyurethane Coating Formulation Weights (Grams) and Pot Life

| | Type | | | | |
|---|---|---|---|---|---|
| Polyester Formulation | Comparative P3 | Example P8 | Example P9 | Example P11 | Example P12 |
| Coating Formulation | C1 | C2 | C3 | C4 | C5 |
| mole % TMCD | 0 | 25 | 50 | 100 | 100 w/ 80 IPA |
| Part A - Grind | | | | | |
| Polyester resin (70 wt. % in n-BuOAc) | 76.23 | 76.23 | 76.23 | 76.23 | 76.23 |
| Ti-Pure R960 $TiO_2$ pigment[a] | 51.89 | 51.89 | 51.89 | 51.89 | 51.89 |
| Part A - Let Down | | | | | |
| BYK-300[b] (10 wt. % in n-BuOAc) | 2.59 | 2.59 | 2.59 | 2.59 | 2.59 |
| Fascat 4202[c] catalyst (1 wt. % in n-BuOAc) | 0.82 | 0.82 | 0.82 | 0.82 | 0.82 |
| Solvent blend (45/45/10 Xylene/MAK/EEP) | 40.99 | 40.99 | 40.99 | 40.99 | 40.99 |
| Total Part A | 172.52 | 172.52 | 172.52 | 172.52 | 172.52 |
| Part B | | | | | |
| Desmodur N 3390 BA/SN[d] (90 wt. % in 1/1 n-BuOAc/solvent naptha 100) | 27.48 | 27.48 | 27.48 | 27.48 | 27.48 |
| Total Parts A + B | 200.00 | 200.00 | 200.00 | 200.00 | 200.00 |
| Pot Life (Coating Viscosity, sec.) | | | | | |
| 0 Hours | 9.4 | 10.0 | 9.9 | 10.8 | 13.3 |
| 2 Hours | 10.2 | 11.5 | 11.7 | 11.4 | 14.4 |
| 4 Hours | 13.9 | 13.9 | 13.0 | 12.0 | 15.4 |
| 6 Hours | 18.9 | 18.3 | 15.2 | 12.8 | 16.6 |

[a]DuPont Titanium Technologies.
[b]BYK-Chemie.
[c]Arkema (dibutyltindilaurate).
[d]Bayer MaterialScience (aliphatic polyisocyanate HDI trimer).

TABLE 4

Comparative and Example (Isocyanurate Crosslinked) Polyurethane Coating Properties at 30 Min./250° F. (121.1° C.) Cure

| | Type | | | | |
|---|---|---|---|---|---|
| Polyester Formulation | C. Ex. P3 | Example P8 | Example P9 | Example P11 | Example P12 |
| Coating Formulation | C1 | C2 | C3 | C4 | C5 |
| mole % TMCD | 0 | 25 | 50 | 100 | 100 w/ 80 IPA |
| Gloss | | | | | |
| 20° | 85.8 | 85.5 | 87.1 | 84.7 | 89.5 |
| 60° | 93.8 | 92.7 | 94.8 | 91.8 | 96.1 |
| DOI | 90.4 | 90.9 | 91.6 | 91.7 | 93.3 |
| Color | | | | | |
| L* | 95.63 | 95.77 | 95.87 | 95.75 | 96.20 |
| a* | −0.78 | −0.77 | −0.76 | −0.77 | −0.73 |
| b* | −0.54 | −0.56 | −0.58 | −0.67 | −0.56 |
| MEK Dbl Rubs (# passed) | 477 | 501 | 750+ | 750+ | 750+ |
| Pencil Hardness | 1H | 1H | 3H | 3H | 4H |
| Tukon Hardness (HK) | 8.0 | 15.8 | 19.2 | 17.2 | 19.1 |
| König Pendulum Hardness (sec.) | | | | | |
| Day 1 | 90 | 123 | 155 | 159 | 174 |
| Day 2 | 85 | 122 | 163 | 164 | 181 |
| Day 7 | 95 | 135 | 172 | 166 | 180 |
| Day 14 | 85 | 137 | 173 | 167 | 185 |
| Day 21 | 91 | 131 | 169 | 168 | 182 |
| Impact Resistance (in.-lb.) | | | | | |
| Forward | 162 | 162 | 156 | 156 | 138 |
| Reverse | 126 | 108 | 90 | 72 | 72 |
| 50% H$_2$SO$_4$ Resistance | | | | | |
| Appearance after 36 days | Severe blistering. | Few blisters. | Faint ring. | No effect. | No effect. |
| Skydrol Fluid Resistance (14 day immersion) | | | | | |
| Initial pencil hardness | 1H | 1H | 3H | 3H | 4H |
| Pencil hardness after soak | 2B | 2B | 2B | 2B | 4H |
| Pencil hardness after 24 hr. recovery | 2B | 2B | 2B | 2B | 4H |

TABLE 5

Comparative and Example (Isocyanurate Crosslinked) Polyurethane Coating Properties at 40 Min./160° F. (71.1° C.) Cure

| | Type | | | | |
|---|---|---|---|---|---|
| Polyester Formulation | Comparative Ex. P3 | Example P8 | Example P9 | Example P11 | Example P12 |
| Coating Formulation | C1 | C2 | C3 | C4 | C5 |
| mole % TMCD | 0 | 25 | 50 | 100 | 100 w/ 80 IPA |
| Gloss | | | | | |
| 20° | 87.1 | 85.7 | 86.3 | 87.0 | 89.1 |
| 60° | 93.5 | 92.8 | 93.3 | 93.4 | 94.2 |
| DOI | 92.8 | 92.1 | 93.8 | 93.8 | 93.5 |
| Color | | | | | |
| L* | 95.88 | 96.14 | 95.78 | 96.14 | 96.27 |
| a* | −0.75 | −0.75 | −0.76 | −0.75 | −0.73 |
| b* | −0.46 | −0.35 | −0.55 | −0.35 | −0.45 |
| MEK Dbl Rubs (# passed) | 589 | 324 | 338 | 200 | 292 |
| Pencil Hardness | 1H | 2H | 3H | 2H | 3H |
| Tukon Hardness (HK) | 8.7 | 13.8 | 17.9 | 17.9 | 20.6 |
| König Pendulum Hardness (sec.) | | | | | |
| Day 1 | 46 | 49 | 77 | 113 | 145 |
| Day 2 | 53 | 71 | 94 | 147 | 183 |
| Day 7 | 65 | 92 | 136 | 175 | 199 |
| Day 14 | 83 | 101 | 159 | 181 | 201 |
| Day 21 | 84 | 115 | 159 | 183 | 204 |
| Impact Resistance (in.-lb.) | | | | | |
| Forward | 162 | 162 | 162 | 150 | 30 |
| Reverse | 126 | 102 | 102 | 66 | <12 |

TABLE 5-continued

Comparative and Example (Isocyanurate Crosslinked) Polyurethane Coating Properties at 40 Min./160° F. (71.1° C.) Cure

| | Type | | | |
|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |
| 50% H₂SO₄ Resistance | | | | | |
| Appearance after 21 days | Few blisters. | Moderate blisters. | Faint ring. | Faint ring. | Faint ring. |

TABLE 6

Comparative and Example (Isocyanurate Crosslinked) Polyurethane Coating Properties at 21 Days/70° F. (21.1° C.) Cure

| | Type | | | | |
|---|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |
| mole % TMCD | 0 | 25 | 50 | 100 | 100 w/ 80 IPA |
| Gloss | | | | | |
| 20° | 87.6 | 87.3 | 87.5 | 87.3 | 88.9 |
| 60° | 94.0 | 93.5 | 93.2 | 93.7 | 93.8 |
| DOI | 93.5 | 94.6 | 94.4 | 95.1 | 94.1 |
| Color | | | | | |
| L* | 95.56 | 96.12 | 96.04 | 96.18 | 95.75 |
| a* | −0.79 | −0.76 | −0.72 | −0.73 | −0.79 |
| b* | −0.59 | −0.41 | −0.50 | −0.46 | −0.60 |
| MEK Dbl Rubs (# passed) | 336 | 182 | 139 | 148 | 321 |
| Pencil Hardness | 1H | 1H | 2H | 1H | 2H |
| Tukon Hardness (HK) | 6.0 | 9.8 | 15.3 | 19.3 | 22.0 |
| König Pendulum Hardness (sec.) | | | | | |
| Day 1 | 17 | 17 | 0 | 0 | 32 |
| Day 2 | 28 | 35 | 49 | 99 | 87 |
| Day 7 | 35 | 59 | 92 | 172 | 164 |
| Day 14 | 52 | 60 | 115 | 186 | 176 |
| Day 21 | 58 | 76 | 116 | 186 | 175 |
| Impact Resistance (in.-lb.) | | | | | |
| Forward | 162 | 162 | 162 | 138 | 30 |
| Reverse | 126 | 102 | 90 | 54 | <12 |
| 50% H₂SO₄ Resistance | | | | | |
| Appearance after 21 days | Moderate blisters. | Few blisters. | Few blisters. | Faint ring. | Faint ring. |

TABLE 7

QUVA Accelerated Weathering Gloss Retention of Comparative and Example (Isocyanurate Crosslinked) Polyurethane Coatings Cured 30 Min./250° F. (121.1° C.)

| | Type | | | | |
|---|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |
| mole % TMCD | 0 | 25 | 50 | 100 | 100 w/ 80 IPA |
| Hours Exposure | 20° Gloss | | | | |
| 0 | 85.2 | 86.0 | 85.9 | 85.0 | 88.4 |
| 250 | 86.2 | 86.9 | 86.7 | 85.7 | 88.1 |
| 500 | 85.6 | 84.8 | 86.6 | 86.6 | 88.4 |
| 750 | 81.9 | 82.7 | 84.6 | 86.7 | 88.7 |
| 1000 | 66.5 | 67.0 | 76.2 | 84.2 | 88.1 |
| 1250 | 47.0 | 55.5 | 68.7 | 83.8 | 88.5 |
| 1500 | 26.4 | 34.0 | 43.6 | 76.1 | 83.6 |
| 1750 | 12.6 | 15.5 | 36.4 | 70.8 | 69.5 |
| 2000 | | | 42.2 | 67.5 | 67.9 |
| 2244 | | | 30.1 | 64.7 | 60.5 |
| 2478 | | | 29.5 | 60.4 | 65.4 |
| 2728 | | | 21.9 | 52.9 | 42.1 |
| 2978 | | | 31.3 | 49.0 | 46.0 |
| 3228 | | | 32.4 | 41.7 | 35.6 |
| 3478 | | | 32.1 | 27.7 | 34.7 |
| 3728 | | | 32.7 | 28.0 | 27.7 |
| 4278 | | | 31.9 | 22.2 | 10.8 |
| Hours Exposure | 60° Gloss | | | | |
| 0 | 93.1 | 93.7 | 93.2 | 92.2 | 95.0 |
| 250 | 93.6 | 93.6 | 93.8 | 92.3 | 94.7 |
| 500 | 93.6 | 93.0 | 93.7 | 93.5 | 95.1 |
| 750 | 92.7 | 92.9 | 93.3 | 94.8 | 95.9 |
| 1000 | 85.9 | 89.6 | 89.7 | 94.1 | 95.2 |
| 1250 | 77.7 | 81.6 | 85.5 | 93.7 | 94.7 |
| 1500 | 77.7 | 81.6 | 85.5 | 93.7 | 94.7 |
| 1750 | 50.7 | 55.4 | 70.4 | 87.6 | 88.2 |
| 2000 | | | 73.9 | 87.5 | 88.0 |
| 2244 | | | 67.2 | 88.1 | 86.5 |
| 2478 | | | 67.1 | 85.1 | 87.7 |
| 2728 | | | 61.3 | 81.0 | 77.0 |
| 2978 | | | 69.6 | 79.3 | 78.0 |
| 3228 | | | 70.4 | 74.8 | 73.0 |
| 3478 | | | 70.7 | 67.6 | 70.9 |
| 3728 | | | 71.4 | 65.0 | 63.9 |
| 4278 | | | 71.4 | 53.4 | 42.2 |

TABLE 8

QUVA Accelerated Weathering Color Change of Comparative and Example (Isocyanurate Crosslinked) Polyurethane Coatings Cured 30 Min./250° F. (121.1° C.)

| | Type | | | | |
|---|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |
| mole % TMCD | 0 | 25 | 50 | 100 | 100 w/ 80 IPA |
| Hours Exposure | Delta E* | | | | |
| 0 | 0.0 | 0.0 | 0.0 | 0.0 | 0.0 |
| 250 | 0.3 | 0.3 | 0.3 | 0.3 | 0.2 |
| 500 | 0.3 | 0.4 | 0.3 | 0.4 | 0.3 |
| 750 | 0.3 | 0.3 | 0.3 | 0.4 | 0.4 |
| 1000 | 0.5 | 0.5 | 0.5 | 0.6 | 0.4 |

TABLE 8-continued

QUVA Accelerated Weathering Color Change of Comparative and Example (Isocyanurate Crosslinked) Polyurethane Coatings Cured 30 Min./250° F. (121.1° C.)

| | Type | | | | |
|---|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |
| 1250 | 0.5 | 0.5 | 0.5 | 0.5 | 0.4 |
| 1500 | 1.4 | 0.9 | 0.9 | 1.0 | 0.9 |
| 1750 | 0.7 | 0.8 | 0.8 | 0.7 | 0.5 |
| 2000 | | 0.7 | 0.6 | 0.8 | |
| 2244 | | 0.8 | 0.9 | 0.6 | |
| 2478 | | 0.9 | 0.7 | 0.6 | |
| 2728 | | 0.9 | 1.1 | 0.7 | |
| 2978 | | 1.0 | 0.9 | 1.0 | |
| 3228 | | 0.9 | 0.7 | 0.8 | |
| 3478 | | 0.9 | 0.8 | 0.9 | |
| 3728 | | 1.0 | 1.3 | 1.4 | |
| 4278 | | 0.9 | 1.0 | 1.0 | |

| Hours Exposure | Yellowness Index | | | | |
|---|---|---|---|---|---|
| 0 | −2.3 | −2.3 | −2.1 | −2.4 | −2.3 |
| 250 | −1.9 | −2.1 | −1.8 | −2.1 | −2.0 |
| 500 | −1.9 | −2.0 | −1.8 | −1.9 | −2.1 |
| 750 | −1.9 | −2.0 | −1.8 | −1.9 | −2.1 |
| 1000 | −1.7 | −1.7 | −1.7 | −1.8 | −1.9 |
| 1250 | −1.6 | −1.6 | −1.6 | −1.8 | −1.8 |
| 1500 | −1.5 | −1.7 | −1.4 | −1.6 | −1.7 |
| 1750 | −1.7 | −1.5 | −1.5 | −1.8 | −1.7 |
| 2000 | | | −1.5 | −1.7 | −1.5 |
| 2244 | | | −1.3 | −1.5 | −1.6 |
| 2478 | | | −1.5 | −1.6 | −1.7 |
| 2728 | | | −1.3 | −1.4 | −1.5 |
| 2978 | | | −1.2 | −1.6 | −1.5 |
| 3228 | | | −1.3 | −1.4 | −1.1 |
| 3478 | | | −1.2 | −1.3 | −0.9 |
| 3728 | | | −1.2 | −1.4 | −0.8 |
| 4278 | | | −1.3 | −1.3 | −0.9 |

TABLE 9

QUVA Accelerated Weathering Gloss Retention of Comparative and Example (Isocyanurate Crosslinked) Polyurethane Coatings Cured 40 Min./160° F. (71.1° C.)

| | Type | | | | |
|---|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |
| mole % TMCD | 0 | 25 | 50 | 100 | 100 w/ 80 IPA |

| Hours Exposure | 20° Gloss | | | | |
|---|---|---|---|---|---|
| 0 | 85.2 | 85.6 | 86.7 | 86.4 | 89.5 |
| 234 | 86.1 | 85.5 | 86.4 | 86.4 | 88.3 |
| 484 | 84.4 | 84.0 | 85.4 | 85.5 | 87.4 |
| 734 | 82.8 | 78.3 | 82.9 | 85.8 | 86.7 |
| 984 | 70.8 | 67.2 | 77.1 | 82.4 | 78.6 |
| 1234 | 57.5 | 53.7 | 70.6 | 76.8 | 79.4 |
| 1484 | 39.3 | 35.5 | 65.4 | 71.1 | 73.6 |
| 1734 | 25.4 | 20.2 | 49.4 | 76.5 | 69.6 |
| 1984 | 8.6 | 10.7 | 38.2 | 45.7 | 61.0 |

TABLE 9-continued

QUVA Accelerated Weathering Gloss Retention of Comparative and Example (Isocyanurate Crosslinked) Polyurethane Coatings Cured 40 Min./160° F. (71.1° C.)

| | Type | | | | |
|---|---|---|---|---|---|
| | Comparative Ex. | Example | Example | Example | Example |
| Polyester Formulation | P3 | P8 | P9 | P11 | P12 |
| Coating Formulation | C1 | C2 | C3 | C4 | C5 |

| Hours Exposure | 60° Gloss | | | | |
|---|---|---|---|---|---|
| 0 | 93.0 | 93.2 | 94.0 | 93.9 | 95.8 |
| 234 | 94.7 | 94.2 | 93.7 | 93.5 | 95.7 |
| 484 | 93.4 | 93.0 | 93.5 | 94.3 | 95.4 |
| 734 | 92.8 | 91.7 | 92.4 | 94.4 | 94.8 |
| 984 | 88.6 | 87.4 | 91.0 | 92.9 | 92.7 |
| 1234 | 83.1 | 82.4 | 88.2 | 91.4 | 93.1 |
| 1484 | 74.0 | 72.3 | 86.4 | 89.9 | 91.8 |
| 1734 | 64.6 | 60.8 | 80.2 | 92.1 | 90.4 |
| 1984 | 49.4 | 50.6 | 72.9 | 90.4 | 87.8 |

TABLE 10

QUVA Accelerated Weathering Color Change of Comparative and Example (Isocyanurate Crosslinked) Polyurethane Coatings Cured 40 Min./160° F. (71.1° C.)

| | Type | | | | |
|---|---|---|---|---|---|
| | Comparative | Example | Example | Example | Example |
| Polyester Formulation | P3 | P8 | P9 | P11 | P12 |
| Coating Formulation | C1 | C2 | C3 | C4 | C5 |
| mole % TMCD | 0 | 25 | 50 | 100 | 100 w/ 80 IPA |

| Hours Exposure | Delta E* | | | | |
|---|---|---|---|---|---|
| 0 | 0.0 | 0.0 | 0.0 | 0.0 | 0.0 |
| 234 | 0.5 | 0.3 | 0.2 | 0.5 | 0.3 |
| 484 | 0.3 | 0.4 | 0.4 | 0.5 | 0.8 |
| 734 | 0.4 | 0.4 | 0.4 | 0.4 | 0.6 |
| 984 | 0.4 | 0.6 | 0.4 | 0.7 | 1.1 |
| 1234 | 0.5 | 0.5 | 0.7 | 0.5 | 0.5 |
| 1484 | 0.7 | 0.5 | 0.5 | 0.8 | 1.0 |
| 1734 | 0.6 | 0.5 | 0.5 | 0.7 | 0.9 |
| 1984 | 1.5 | 1.2 | 1.0 | 0.8 | 1.0 |

| Hours Exposure | Yellowness Index | | | | |
|---|---|---|---|---|---|
| 0 | −2.0 | −1.9 | −2.0 | −1.6 | −1.7 |
| 234 | −1.6 | −1.5 | −1.7 | −1.7 | −1.3 |
| 484 | −1.6 | −1.6 | −1.5 | −1.5 | −1.5 |
| 734 | −1.7 | −1.5 | −1.7 | −1.3 | −1.4 |
| 984 | −1.5 | −1.2 | −1.4 | −1.3 | −1.0 |
| 1234 | −1.3 | −1.3 | −1.6 | −1.2 | −1.0 |
| 1484 | −1.4 | −1.3 | −1.3 | −1.2 | −1.1 |
| 1734 | −1.4 | −1.3 | −1.4 | −1.3 | −1.1 |
| 1984 | −1.4 | −1.3 | −1.3 | −1.2 | −1.1 |

TABLE 11

QUVA Accelerated Weathering Gloss Retention of Comparative and Example (Isocyanurate Crosslinked) Polyurethane Coatings Cured 21 Days/70° F. (21.1° C.)

| | Type | | | | |
|---|---|---|---|---|---|
| Polyester Formulation<br>Coating Formulation | Comparative Ex.<br>P3<br>C1 | Example<br>P8<br>C2 | Example<br>P9<br>C3 | Example<br>P11<br>C4 | Example<br>P12<br>C5 |
| mole % TMCD | 0 | 25 | 50 | 100 | 100 w/ 80 IPA |
| Hours Exposure | 20° Gloss | | | | |
| 0 | 87.2 | 86.9 | 87.9 | 87.6 | 88.8 |
| 234 | 87.0 | 87.1 | 87.0 | 87.3 | 86.2 |
| 484 | 83.5 | 84.4 | 85.6 | 84.2 | 75.0 |
| 734 | 77.7 | 81.6 | 83.8 | 84.5 | 65.5 |
| 984 | 58.2 | 74.5 | 77.5 | 79.1 | 34.2 |
| 1234 | 34.5 | 68.0 | 77.6 | 76.0 | 36.9 |
| 1484 | 22.0 | 58.6 | 71.9 | 67.4 | 44.2 |
| 1734 | 11.3 | 40.6 | 58.8 | 69.9 | 32.4 |
| 1984 | — | 29.2 | 51.7 | 69.3 | 38.2 |
| Hours Exposure | 60° Gloss | | | | |
| 0 | 93.9 | 93.7 | 94.6 | 94.3 | 95.5 |
| 234 | 93.9 | 94.0 | 94.6 | 94.6 | 94.5 |
| 484 | 93.2 | 93.3 | 93.6 | 93.6 | 90.7 |
| 734 | 91.5 | 93.3 | 94.0 | 93.4 | 86.0 |
| 984 | 83.5 | 90.6 | 93.0 | 91.1 | 73.1 |
| 1234 | 71.7 | 87.7 | 91.1 | 89.4 | 75.2 |
| 1484 | 61.9 | 83.9 | 88.3 | 87.6 | 78.4 |
| 1734 | 48.6 | 75.2 | 84.0 | 86.1 | 71.2 |
| 1984 | — | 67.4 | 80.4 | 86.6 | 74.0 |

TABLE 12

QUVA Accelerated Weathering Color Change of Comparative and Example (Isocyanurate Crosslinked) Polyurethane Coatings Cured 21 Days/70° F. (21.1° C.)

| | Type | | | | |
|---|---|---|---|---|---|
| Polyester Formulation<br>Coating Formulation | Comparative Ex.<br>P3<br>C1 | Example<br>P8<br>C2 | Example<br>P9<br>C3 | Example<br>P11<br>C4 | Example<br>P12<br>C5 |
| mole % TMCD | 0 | 25 | 50 | 100 | 100 w/ 80 IPA |
| Hours Exposure | Delta E* | | | | |
| 0 | 0.0 | 0.0 | 0.0 | 0.0 | 0.0 |
| 234 | 0.3 | 0.3 | 0.4 | 0.5 | 1.1 |
| 484 | 0.4 | 0.3 | 0.3 | 0.5 | 1.3 |
| 734 | 0.3 | 0.5 | 0.4 | 0.4 | 1.1 |
| 984 | 1.0 | 0.3 | 0.4 | 0.7 | 1.2 |
| 1234 | 0.5 | 0.4 | 0.6 | 0.6 | 1.5 |
| 1484 | 0.7 | 0.6 | 0.8 | 0.5 | 1.6 |
| 1734 | 0.5 | 0.6 | 0.4 | 0.5 | 1.4 |
| 1984 | — | 1.0 | 0.7 | 0.7 | 1.8 |
| Hours Exposure | Yellowness Index | | | | |
| 0 | -2.0 | -2.3 | -2.0 | -1.9 | -1.6 |
| 234 | -1.8 | -2.0 | -1.9 | -1.8 | -1.8 |
| 484 | -1.5 | -1.9 | -1.6 | -1.6 | -1.2 |
| 734 | -1.8 | -1.9 | -1.7 | -1.5 | -1.2 |
| 984 | -1.4 | -1.9 | -1.7 | -1.5 | -1.2 |
| 1234 | -1.6 | -1.9 | -1.5 | -1.4 | -0.9 |
| 1484 | -1.5 | -1.8 | -1.5 | -1.4 | -1.0 |
| 1734 | -1.7 | -1.7 | -1.5 | -1.4 | -1.1 |
| 1984 | — | -1.9 | -1.6 | -1.3 | -1.1 |

Preparation of Polyurethane Coatings Crosslinked with the Biuret of HDI and Resulting Properties White-pigmented polyurethane coatings were prepared from comparative polyester resin P3 and example polyester resin P11 as described in example 2 and are shown in Table 13. The resins were crosslinked with the biuret of 1,6-hexamethylene diisocyanate at a 1.1:1 NCO:OH equivalent ratio.

The coatings were force-dried 30 minutes at 250° F. (121.1° C.). Coating properties, shown in Tables 14 and 15, were determined as described in example 2. Example coating C7 has similar gloss, DOI, color and methyl ethyl ketone ("MEK") double rubs relative to comparative coating C6 (see Table 14). Example coating C7 was not affected after 21 days exposure to a aqueous 50% $H_2SO_4$ solution, but comparative coating C6 was severely blistered. Example coating C7 retained slightly higher pencil hardness than comparative coating C6 after 14 days immersion in Skydrol fluid.

During QUVA (340 nm) accelerated weathering exposure, example coating C7 showed much better gloss retention as indicated by the data in Table 15. Comparative coating C6 lost 75% of its 20° gloss by 1000 hours exposure. It took twice as long for example coating C7 to show the same amount of gloss loss. Both coatings exhibited low color development.

TABLE 13

Comparative and Example (Biuret Crosslinked) Polyurethane Coating Formulation Weights (Grams) and Properties

| | Type | |
|---|---|---|
| Polyester Formulation<br>Coating Formulation | Comparative<br>P3<br>C6 | Example<br>P11<br>C7 |
| mole % TMCD | 0 | 100 |
| Part A - Grind | | |
| Polyester resin (70 wt. % in n-BuOAc) | 71.97 | 71.97 |
| Ti-Pure R960 $TiO_2$ pigment[a] | 51.89 | 51.89 |
| Part A - Let Down | | |
| BYK-300[b] (10 wt. % in n-BuOAc) | 2.59 | 2.59 |
| Fascat 4202[c] catalyst (1 wt. % in n-BuOAc) | 0.82 | 0.82 |
| Solvent blend (45/45/10 Xylene/MAK/EEP) | 36.11 | 36.11 |
| Total Part A | 163.39 | 163.39 |
| Part B | | |
| Desmodur N 75 BA/X[d] (75 wt. % solids) | 36.61 | 36.61 |
| Total Parts A + B | 200.00 | 200.00 |
| Pot Life (Coating Viscosity, sec.) | | |
| 0 Hour | 9.8 | 10.3 |
| 1 Hour | 12.0 | 11.1 |
| 2 Hours | 12.1 | — |

TABLE 13-continued

Comparative and Example (Biuret Crosslinked) Polyurethane Coating Formulation Weights (Grams) and Properties

| | Type | |
|---|---|---|
| | Comparative | Example |
| Polyester Formulation | P3 | P11 |
| Coating Formulation | C6 | C7 |
| 3 Hours | — | 11.1 |
| 4 Hours | 14.2 | 13.1 |
| 5 Hours | 14.6 | — |
| 6 Hours | — | 12.6 |
| 7 Hours | 32.1 | — |

(a) DuPont Titanium Technologies.
(b) BYK-Chemie.
(c) Arkema (dibutyltindilaurate).
(d) Bayer MaterialScience (aliphatic polyisocyanate HDI biuret).

TABLE 14

Comparative and Example (Biuret Crosslinked) Polyurethane Coating Properties

| | Type | |
|---|---|---|
| | Comparative Ex. | Example |
| Polyester Formulation | P3 | P11 |
| Coating Formulation | C6 | C7 |
| mole % TMCD | 0 | 100 |
| Gloss | | |
| 20° | 85.4 | 84.7 |
| 60° | 92.9 | 91.8 |
| DOI | 90.1 | 93.0 |
| Color | | |
| L* | 95.71 | 96.26 |
| a* | −0.79 | −0.72 |
| b* | −0.58 | −0.50 |
| MEK Dbl Rubs (# passed) | 750+ | 750+ |
| Pencil Hardness | 1H | 3H |
| Tukon Hardness (HK) | 8.6 | 16.7 |
| König Pendulum Hardness (sec.) | | |
| Day 1 | 71 | 160 |
| Day 2 | 69 | 167 |
| Day 7 | 90 | 169 |
| Day 14 | 87 | 167 |
| Day 21 | 86 | 173 |
| Impact Resistance (in.-lb.) | | |
| Forward | 150 | 138 |
| Reverse | 108 | 66 |
| 50% H$_2$SO$_4$ Resistance | | |
| Appearance after 21 days | Severe blistering. | No effect. |
| Skydrol Fluid Resistance (14 day immersion) | | |
| Initial pencil hardness | 1H | 3H |
| Pencil hardness after soak | 2B | 1B |
| Pencil hardness after 24 hr. recovery | 2B | 1B |

TABLE 15

QUVA Accelerated Weathering Gloss and Color Change of Comparative and Example (Biuret Crosslinked) Polyurethane Coatings

| | Type | | | |
|---|---|---|---|---|
| Polyester Formulation | Comparative Ex. P3 | Example P11 | Comparative P3 | Example P11 |
| Coating Formulation | C6 | C7 | C6 | C7 |
| mole % TMCD | 0 | 100 | 0 | 100 |
| Hours Exposure | 20° Gloss | | Delta E* | |
| 0 | 85.9 | 86.0 | 0.0 | 0 |
| 250 | 86.6 | 87.1 | 0.4 | 0.4 |
| 500 | 78.1 | 86.4 | 0.5 | 0.6 |
| 750 | 52.4 | 82.7 | 0.5 | 0.6 |
| 1000 | 21.4 | 73.3 | 1.2 | 0.8 |
| 1250 | 11.1 | 60.9 | 0.7 | 1.0 |
| 1500 | | 50.7 | | 1.3 |
| 1750 | | 38.8 | | 1.2 |
| 2000 | | 17.0 | | 1.1 |
| Hours Exposure | 60° Gloss | | Yellowness Index | |
| 0 | 93.4 | 93.2 | −2.2 | −2.0 |
| 250 | 93.7 | 93.8 | −1.8 | −1.6 |
| 500 | 91.0 | 93.4 | −1.6 | −1.4 |
| 750 | 82.1 | 93.3 | −1.6 | −1.2 |
| 1000 | 61.9 | 88.7 | −1.4 | −1.0 |
| 1250 | 49.4 | 83.5 | −1.3 | −0.7 |
| 1500 | | 79.4 | | −0.9 |
| 1750 | | 74.5 | | −0.9 |
| 2000 | | 58.5 | | −0.8 |

Preparation of Polyester-Melamine Thermoset Coatings and Resulting Properties

White-pigmented polyester-melamine coatings were prepared in accordance with the following procedure and are shown in Table 16. The polyester resins were crosslinked with hexamethoxymethylmelamine at a 75:25 polyester:melamine ratio.

The polyester resin and pigment were added to a 500-mL stainless steel beaker. A cowles disperser was used to grind the resin and pigment to a 7+ Hegman, which took about 5 min. at 5000 rpm. The catalyst then was added to the melamine and thoroughly mixed together. The catalyst/melamine blend was then added to the grind and thoroughly mixed for a few minutes. Finally, the flow aid and let-down solvent blend were added and thoroughly mixed. The coating was filtered through a HAYWARD™ PE 100 PN164 300M felt paint filter inside a medium mesh paper filter and transferred into a glass jar and rolled until needed.

Coating viscosity was determined with a Gardco mini Ford dip cup #4 and a Brookfield LVDV-II+ Pro viscometer. For Brookfield viscosity, a sample of the coating was placed into a 1 oz. jar. The viscosity was then measured using spindle #63 (LV3) at a speed of 100 rpm.

A wire wound rod was used to apply the coating to glass microscope slides and polished cold rolled steel test panels with Bonderite 1000 pretreatment. The rod was selected to achieve a 1.7±0.2 mil dry film thickness.

After application, the coatings were allowed to flash at room temperature for ten minutes then cured in a forced-air oven under one of the following conditions:
20 minutes at 248° F. (120° C.).
25 minutes at 248° F. (120° C.).
30 minutes at 248° F. (120° C.).
20 minutes at 275° F. (135° C.).
25 minutes at 275° F. (135° C.).

30 minutes at 275° F. (135° C.).
20 minutes at 302° F. (150° C.).
25 minutes at 302° F. (150° C.).
30 minutes at 302° F. (150° C.).

The cure schedules are representative of various OEM applications such as automotive, appliance, general metal, machinery and equipment and metal furniture.

The following properties were determined as described in example 2 after allowing the coatings to relax for one week and are shown in Tables 17-19: specular gloss, distinctness of image, color, hardness and flexibility.

The coatings were also subjected to various chemical and stain spot tests in accordance with ASTM method D 1308. The tests included:
- 3 days 50% $H_2SO_4$.
- 3 days 50% NaOH.
- 30 min. iodine.
- 24 hr. mustard.
- 24 hr. ketchup.
- 5 days grease (Mobil Polyrex EM electric motor bearing grease).
- 24 hr. red lipstick.
- 24 hr. brown shoe polish.
- 48 hr. black Sharpie marker.

With the exception of the black marker, all reagents were covered with a watch glass during testing. After each test period, the watch glass was removed, and the chemical and stain area was washed with a sponge and mild solution of Dawn dishwashing detergent. The test area was then rinsed with cold water and wiped dry before evaluation. The black marker was cleaned using a cotton cloth dampened with Goof-Off (Valspar) commercial all-purpose remover. The test area was then rinsed with cold water and dried. The effect of each reagent on the coating was rated according to the following scale: 5=no effect; 4=slight effect; 3=moderate effect; 2=considerable effect; 1=severe effect.

Example TMCD coatings C9 and C10 have comparable gloss, DOI and color as comparative NPG coating C8 (Tables 17-19). MEK double rub resistance increases as TMCD content in the coating (C9 and C10) increases relative to comparative NPG coating C8. For all coatings, the MEK double rubs tend to increase as the cure time/temperature increases (see Tables 17-19). Hardness, as measured by pencil, Tukon and Konig tests, increases as TMCD content increases within a given cure schedule relative to comparative NPG coating C8 (see Tables 17-19). Tables 17-19 show that good flexibility (by impact resistance) is maintained as TMCD content increases relative to the coating hardness that is gained. In addition, Example TMCD coatings C9 and C10 exhibit better acid, base, and stain resistance than comparative NPG coating C8.

TABLE 16

Comparative and Example Polyester-Melamine Crosslinked Coating Formulation Weights (Grams) and Properties

| | Type | | |
|---|---|---|---|
| | Comparative Ex. | Example | Example |
| Polyester Formulation | P3 | P9 | P11 |
| Coating Formulation | C8 | C9 | C10 |
| mole % TMCD | 0 | 50 | 100 |
| Pigment Grind | | | |
| Polyester resin (70 wt. % in n-BuOAc) | 156.84 | 156.84 | 156.84 |
| Ti-Pure R960 $TiO_2$ pigment[a] | 97.59 | 97.59 | 97.59 |

TABLE 16-continued

Comparative and Example Polyester-Melamine Crosslinked Coating Formulation Weights (Grams) and Properties

| | Type | | |
|---|---|---|---|
| | Comparative Ex. | Example | Example |
| Polyester Formulation | P3 | P9 | P11 |
| Coating Formulation | C8 | C9 | C10 |
| Let-Down | | | |
| Cymel 303 LF melamine resin[b] | 36.60 | 36.60 | 36.60 |
| Cycat 4040 catalyst[b] (40 wt. % in i-PrOH) | 1.10 | 1.10 | 1.10 |
| BYK-361 N[c] (50 wt. % in n-BuOH) | 1.17 | 1.17 | 1.17 |
| Solvent blend (45/45/10 Xylene/MAK/EEP) | 56.71 | 56.71 | 56.71 |
| Total | 350.00 | 350.00 | 350.00 |
| Coating Viscosity | | | |
| #4 Mini Ford dip cup, sec. | 29.5 | 31.8 | 43.5 |
| Brookfield, cP | 150 | 174 | 238 |

[a]DuPont Titanium Technologies.
[b]Cytec Industries Inc.
[c]BYK-Chemie.

TABLE 17

Comparative Polyester-Melamine Crosslinked Coating Properties (Polyester Formulation P3/Coating Formulation C8)

| | Cure Schedule (Min./Temp.) | | | | |
|---|---|---|---|---|---|
| | 20/120 | 30/120 | 25/135 | 20/150 | 30/150 |
| Gloss | | | | | |
| 20° | 84.6 | 84.8 | 84.4 | 80.6 | 78.6 |
| 60° | 93.3 | 94.3 | 94.2 | 93.8 | 93.4 |
| DOI | 89.5 | 91.1 | 88.2 | 86.3 | 82.9 |
| Color | | | | | |
| L* | 96.31 | 96.29 | 96.90 | 96.11 | 96.35 |
| a* | −0.77 | −0.77 | −0.73 | −0.78 | −0.76 |
| b* | −0.32 | −0.35 | −0.13 | −0.47 | −0.37 |
| MEK Dbl Rubs (# passed) | 248 | 160 | 530 | 395 | 536 |
| Pencil Hardness | 1H | 2H | 2H | 3H | 4H |
| Tukon Hardness (HK) | <1 | 2.1 | 2.6 | 6.0 | 8.5 |
| König Pendulum Hardness (sec.) | 18 | 32 | 46 | 63 | 91 |
| Impact Resistance (in.-lb.) | | | | | |
| Forward | 150 | 150 | 234 | 198 | 186 |
| Reverse | 126 | 126 | 162 | 162 | 162 |
| Chemical Resistance | | | | | |
| 50% $H_2SO_4$ | 1 | 1 | 1 | 1 | 1 |
| 50% NaOH | 2 | 2 | 3 | 3 | 2 |
| Stain Resistance | | | | | |
| Iodine | 1 | 1 | 1 | 1 | 2 |
| Mustard | 1 | 1 | 2 | 2 | 2 |
| Ketchup | 5 | 5 | 5 | 5 | 5 |
| Grease | 4 | 4 | 5 | 5 | 5 |
| Red lipstick | 2 | 2 | 2 | 3 | 3 |
| Brown shoe polish | 1 | 1 | 1 | 2 | 2 |
| Black marker | 2 | 3 | 3 | 3 | 3 |

TABLE 18

Example Polyester-Melamine Crosslinked Coating Properties
(Polyester Formulation P9/Coating Formulation C9)

| | Cure Schedule (Min./Temp.) | | | | |
|---|---|---|---|---|---|
| | 25/120 | 20/135 | 25/135 | 30/135 | 25/150 |
| Gloss | | | | | |
| 20° | 84.0 | 81.7 | 81.6 | 83.0 | 81.3 |
| 60° | 93.8 | 92.9 | 93.3 | 94.0 | 93.6 |
| DOI | 90.4 | 88.4 | 87.5 | 88.6 | 84.6 |
| Color | | | | | |
| L* | 96.45 | 95.96 | 96.50 | 96.25 | 96.18 |
| a* | −0.74 | −0.78 | −0.75 | −0.75 | −0.77 |
| b* | −0.33 | −0.55 | −0.33 | −0.45 | −0.48 |
| MEK Dbl Rubs (# passed) | 180 | 406 | 448 | 651 | 705 |
| Pencil Hardness | 2H | 2H | 2H | 2H | 4H |
| Tukon Hardness (HK) | 15.5 | 15.3 | 18.2 | 17.4 | 18.9 |
| König Pendulum Hardness (sec.) | 138 | 151 | 165 | 173 | 177 |
| Impact Resistance (in.-lb.) | | | | | |
| Forward | 174 | 210 | 210 | 210 | 186 |
| Reverse | 126 | 138 | 138 | 186 | 114 |
| Chemical Resistance | | | | | |
| 50% H$_2$SO$_4$ | 3 | 3 | 3 | 3 | 3 |
| 50% NaOH | 5 | 5 | 5 | 5 | 5 |
| Stain Resistance | | | | | |
| Iodine | 1 | 2 | 3 | 3 | 3 |
| Mustard | 4 | 4 | 4 | 4 | 4 |
| Ketchup | 5 | 5 | 5 | 5 | 5 |
| Grease | 5 | 5 | 5 | 5 | 5 |
| Lipstick | 4 | 4 | 5 | 4 | 5 |
| Shoe polish | 2 | 2 | 2 | 2 | 2 |
| Black marker | 3 | 3 | 3 | 4 | 5 |

TABLE 19

Example Polyester-Melamine Crosslinked Coating Properties
(Polyester Formulation P11/Coating Formulation C10)

| | Cure Schedule (Min./Temp.) | | | | |
|---|---|---|---|---|---|
| | 20/120 | 30/120 | 25/135 | 20/150 | 30/150 |
| Gloss | | | | | |
| 20° | 85.0 | 85.8 | 84.3 | 82.6 | 81.2 |
| 60° | 93.7 | 94.3 | 94.0 | 93.2 | 92.9 |
| DOI | 92.0 | 91.6 | 89.9 | 86.5 | 86.3 |
| Color | | | | | |
| L* | 96.92 | 96.65 | 97.01 | 96.63 | 96.50 |
| a* | −0.69 | −0.72 | −0.69 | −0.72 | −0.73 |
| b* | −0.20 | −0.29 | −0.19 | −0.35 | −0.40 |
| MEK Dbl Rubs (# passed) | 144 | 274 | 555 | 750+ | 750+ |
| Pencil Hardness | 2H | 3H | 3H | 5H | 5H |
| Tukon Hardness (HK) | 14.9 | 16.8 | 16.8 | 17.2 | 18.2 |
| König Pendulum Hardness (sec.) | 175 | 180 | 182 | 183 | 183 |
| Impact Resistance (in.-lb.) | | | | | |
| Forward | 150 | 150 | 222 | 210 | 198 |
| Reverse | 78 | 78 | 138 | 90 | 90 |
| Chemical Resistance | | | | | |
| 50% H$_2$SO$_4$ | 3 | 3 | 3 | 3 | 4 |
| 50% NaOH | 5 | 5 | 5 | 5 | 5 |
| Stain Resistance | | | | | |
| Iodine | 3 | 4 | 4 | 5 | 5 |
| Mustard | 5 | 5 | 5 | 5 | 5 |
| Ketchup | 5 | 5 | 5 | 5 | 5 |
| Grease | 5 | 5 | 5 | 5 | 5 |
| Lipstick | 5 | 5 | 5 | 5 | 5 |
| Shoe polish | 2 | 2 | 2 | 3 | 4 |
| Black marker | 3 | 3 | 3 | 5 | 5 |

We claim:

1. A curable polyester, consisting of:
   i. diacid residues, comprising about 20 to 100 mole percent, based on the total moles of diacid residues, of the residues of isophthalic acid;
   ii. diol residues, comprising about 10 to 100 mole percent, based on the total moles of diol residues, of the residues of 2,2,4,4-tetramethyl-1,3-cyclobutanediol; and
   iii. polyol residues, comprising about 2 to about 40 mole percent of the residues of at least one polyol, based on the total moles of diol and polyol residues;
   wherein said curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester.

2. The curable polyester according to claim 1, wherein said diacid residues comprise about 20 to 80 mole percent isophthalic acid and further comprise about 80 to about 20 mole percent adipic acid and 0 to about 30 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid; and said diol residues comprise about 20 to 100 mole percent of the residues of 2,2,4,4-tetramethyl-1,3-cyclobutanediol.

3. The curable polyester according to claim 1, wherein said diacid residues (i) comprise about 40 to about 60 mole percent of the residues of isophthalic acid, about 60 to about 40 mole percent of the residues of adipic acid.

4. The curable polyester according to claim 1, wherein said diol residues (ii) further comprise up to 90 mole percent of the residues of at least one diol selected from the group consisting of neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

5. The curable polyester according to claim 1, wherein said polyol residues (iii) comprise the residues of one or more polyols selected from the group consisting of trimethylolpropane, pentaerythritol, trimethylolethane, erythritol, threitol, dipentaerythritol, sorbitol, and glycerine.

6. The curable polyester according to claim 2, wherein said diol residues (ii) comprise about 40 to about 60 mole percent of the residues of 2,2,4,4-tetramethyl-1,3-cyclobutanediol and about 60 to 40 mole percent of the residues of neopentyl glycol and said polyol residues (iii) comprise the residues of one or more polyols selected from the group consisting of trimethylolpropane, pentaerythritol, trimethylolethane, erythritol, and dipentaerythritol.

7. The curable polyester according to claim 1, wherein said diacid residues (i) comprise about 50 to 100 mole percent of the residues of isophthalic acid and 0 to about 50 mole percent of the residues of adipic acid, said diol residues (ii) comprise about 100 mole percent of the residues of 2,2,4,4-tetramethyl-1,3-cyclobutanediol, and said polyol residues (iii) comprise about 10 mole percent of the residues of trimethylolpropane, wherein said curable polyester has a hydroxyl number of about 30 to about 250 mg potassium hydroxide per gram of polyester, an acid number of about 2 to about 15 mg potassium hydroxide per gram of polyester, a number average molecular weight of about 700 to about 7000 daltons, and a Tg of about −20 to about 50° C.

8. A thermosetting coating composition, comprising:
(A). about 50 to about 90 weight percent, based on the total weight of (A) and (B), of at least one curable polyester, consisting of
   i. diacid residues, comprising about 20 to 100 mole percent, based on the total moles of diacid residues, of the residues of isophthalic acid,
   ii. diol residues, comprising about 10 to 100 mole percent, based on the total moles of diol residues, of the residues of 2,2,4,4-tetramethyl-1,3-cyclobutanediol; and
   iii. about 2 to about 40 mole percent of the residues of at least one polyol, based on the total moles of diol and polyol residues;
wherein said curable polyester has a number average molecular weight of about 500 to about 10,000 daltons, a glass transition temperature of about −35° C. to about 50° C., a hydroxyl number of about 20 to about 300 mg KOH/g of polyester, and an acid number of 0 to about 80 mg KOH/g of polyester;
(B). about 10 to about 50 weight percent, based on the total weight of (A) and (B), of a crosslinker comprising at least one compound reactive with a carboxylic acid or a hydroxyl group;
(C). about 10 to about 60 weight percent, based on the total weight of (A), (B), and (C), of at least one nonaqueous solvent.

9. The coating composition according to claim 8, wherein said diacid residues (i) comprise about 20 to about 80 mole percent isophthalic acid and further comprise about 80 to about 20 mole percent adipic acid and from 0 to 30 mole percent of the residues of at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid; and said diol residues (ii) comprise about 20 to 100 mole percent of the residues of 2,2,4,4-tetramethyl-1,3-cyclobutanediol.

10. The coating composition according to claim 8, wherein said diacid residues (i) comprise about 40 to about 60 mole percent of the residues of isophthalic acid, about 60 to about 40 mole percent of the residues of adipic acid.

11. The coating composition according to claim 8, wherein said diol residues (ii) further comprise up to 90 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

12. The coating composition according to claim 8, wherein said polyol residues (iii) comprise the about 3 to about 30 mole percent of residues of at least one polyol selected from the group consisting of trimethylolpropane, pentaerythritol, trimethylolethane, erythritol, threitol, dipentaerythritol, sorbitol, and glycerine.

13. The coating composition according to claim 12, wherein said diol residues (ii) comprise about 40 to about 60 mole percent of the residues of 2,2,4,4-tetramethyl-1,3-cyclobutanediol and about 60 to 40 mole percent of the residues of neopentyl glycol and said polyol residues (iii) comprise the residues of at least one polyol chosen from trimethylolpropane, pentaerythritol, trimethylolethane, erythritol, and dipentaerythritol.

14. The coating composition according to claim 8, wherein said diacid residues (i) comprise about 50 to 100 mole percent of the residues of isophthalic acid and 0 to about 50 mole percent of the residues of adipic acid, said diol residues (ii) comprise about 100 mole percent of the residues of 2,2,4,4-tetramethyl-1,3-cyclobutanediol, and said polyol residues (iii) comprise about 10 mole percent of the residues of trimethylolpropane, wherein said curable polyester has a hydroxyl number of about 30 to about 250 mg potassium hydroxide per gram of polyester, an acid number of about 2 to about 15 mg potassium hydroxide per gram of polyester, a number average molecular weight of about 700 to about 7000 daltons, and a Tg of about −20° C. to about 50° C.

15. The coating composition according to claim 8, wherein said crosslinker comprises at least one compound chosen from epoxides, melamines, isocyanates, and isocyanurates.

16. The coating composition according to claim 15, wherein said crosslinker comprises at least one epoxide compound chosen from epoxy resins containing bisphenol A, epoxy novalac resins, epoxy resins containing bisphenol F, and triglycidylisocyanurate.

17. The coating composition according to claim 15, wherein said crosslinker comprises at least one melamine compound chosen from hexamethoxymethylmelamine, tetramethoxymethylbenzoguanamine, tetramethoxymethylurea, and mixed butoxy/methoxy substituted melamines.

18. The coating composition according to claim 15, wherein said crosslinker comprises isocyanurates of 1,6-hexamethylene diisocyanate, the biuret of 1,6-hexamethylene diisocyanate, or combinations thereof.

19. The coating composition according to claim 8, wherein said nonaqueous solvent comprises benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, or combinations thereof.

20. A shaped object coated with the coating composition of claim 8.

\* \* \* \* \*